United States Patent
He et al.

(10) Patent No.: US 11,943,429 B2
(45) Date of Patent: Mar. 26, 2024

(54) SUBPICTURE SIGNALING IN VIDEO CODING

(71) Applicant: QUALCOMM Incorporated, San Diego, CA (US)

(72) Inventors: Yong He, San Diego, CA (US); Vadim Seregin, San Diego, CA (US); Muhammed Zeyd Coban, Carlsbad, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/189,976

(22) Filed: Mar. 2, 2021

(65) Prior Publication Data

US 2021/0281832 A1  Sep. 9, 2021

Related U.S. Application Data

(60) Provisional application No. 63/003,710, filed on Apr. 1, 2020, provisional application No. 62/984,895, filed on Mar. 4, 2020.

(51) Int. Cl.
*H04N 19/70* (2014.01)
*H04N 19/105* (2014.01)
(Continued)

(52) U.S. Cl.
CPC ......... *H04N 19/105* (2014.11); *H04N 19/159* (2014.11); *H04N 19/172* (2014.11);
(Continued)

(58) Field of Classification Search
CPC .. H04N 19/105; H04N 19/159; H04N 19/172; H04N 19/188; H04N 19/196;
(Continued)

(56) References Cited

U.S. PATENT DOCUMENTS

2014/0086333 A1   3/2014  Wang
2015/0373358 A1* 12/2015  Pang .................... H04N 19/176
                                                                 375/240.12
(Continued)

OTHER PUBLICATIONS

Choi (Samsung) B., et al., "On Parameter Set Prediction", 13. JCT-VC Meeting, Apr. 18, 2013-Apr. 26, 2013, Incheon, (Joint Collaborative Team on Video Coding of ISO/IEC JTC1/SC29/WG11 and ITU-T SG.16 ), No. JCTVC-M0165, Apr. 12, 2013 (Apr. 12, 2013), XP030237000, 11 Pages, Retrieved from the Internet: URL: http://phenix.int-evry.fr/jct/doc_end_user/documents/13_Incheon/wg11/JCTVC-M0165-v3.zip. JCTVC-M0165.doc. [retrieved on Apr. 12, 2013].

(Continued)

*Primary Examiner* — Joseph W Becker
(74) *Attorney, Agent, or Firm* — Shumaker & Sieffert, P.A.

(57) ABSTRACT

An example device for coding video data includes memory configured to store the video data and one or more processors implemented in circuitry and communicatively coupled to the memory. The one or more processors are configured to determine whether a sequence parameter set of the video data refers to a video parameter set. Based on the sequence parameter set not referring to the video parameter set, the one or more processors are configured to determine a value of a first syntax element to be indicative of a profile-tier-layer structure being signaled in the sequence parameter set and code the video data based on the profile-tier-layer structure.

12 Claims, 11 Drawing Sheets

(51) Int. Cl.
*H04N 19/159* (2014.01)
*H04N 19/169* (2014.01)
*H04N 19/172* (2014.01)
*H04N 19/196* (2014.01)

(52) U.S. Cl.
CPC ......... *H04N 19/188* (2014.11); *H04N 19/196* (2014.11); *H04N 19/70* (2014.11)

(58) Field of Classification Search
CPC .... H04N 19/70; H04N 19/597; H04N 21/816; H04N 21/85406; H04N 19/174; H04N 19/107; H04N 19/157; H04N 19/30
See application file for complete search history.

(56) References Cited

U.S. PATENT DOCUMENTS

| | | | | |
|---|---|---|---|---|
| 2017/0019673 | A1* | 1/2017 | Tsukuba | H04N 19/30 |
| 2018/0184091 | A1* | 6/2018 | Wang | H04N 19/31 |
| 2018/0255317 | A1* | 9/2018 | Wang | H04N 19/55 |

OTHER PUBLICATIONS

Partial International Search Report—PCT/US2021/020720—ISA/EPO—dated Jun. 10, 2021.
Bross B., et al., "Versatile Video Coding (Draft 8)", JVET-Q2001-vC, Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001, Feb. 9, 2020 (Feb. 9, 2020), XP030285388, 512 pages, Retrieved from the Internet: URL: http://phenix.int-evry.fr/jvet/doc_end_user/documents/17_Brussels/wg11/JVET-Q2001-v13.zip. JVET-Q2001-vC.docx [retrieved on Feb. 9, 2020].
Bross B., et al., "Versatile Video Coding Editorial Refinements on Draft 10", JVET-T2001-v1, Joint Video Experts Team (JVET) of ITU-T SG 16 WP 3 and ISO/IEC JTC 1/SC 29, 20th Meeting, by Teleconference, Oct. 7-16, 2020, pp. 1-514.
Chen J., et al., "Algorithm Description of Joint Exploration Test Model 1", 1. JVET Meeting, Oct. 19-21, 2015, Geneva , CH (The Joint Video Exploration Team of ISO/IEC JTC1/SC29/WG11 and ITU-T SG. 16 WP 3), No. JVET-A1001, Feb. 24, 2016 (Feb. 24, 2016), XP030150000, 27 Pages, URL: http://phenix.int-evry.fr/jvet/.
He Y., et al., "AHG9: Miscellaneous HLS Topics", JVET-R0266, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-5.
"Information Technology—Coded Representation of Immersive Media—Part 2: Omnidirectional Media Format (OMAF) 2nd Edition", DIS stage, ISO 23090-2:2020(E), ISO TC 1/SC 29/WG 11, 2020, 306 pages.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Seregin V., et al., "AHG8: On PTL, HRD, and DPB Structures Signalling in VPS and SPS", JVET-R0275-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-10.
Al-Jobouri L., et al., "Effective Video Transport over WiMAX with Data Partitioning and Rateless Coding", Computer and Information Technology (CIT), 2010 IEEE 10th International Conference on, IEEE, Piscataway, NJ, USA, Jun. 29, 2010 (Jun. 29, 2010), pp. 767-772, XP031757705, ISBN: 978-1-4244-7547-6.
International Search Report and Written Opinion—PCT/US2021/020720—ISA/EPO—dated Sep. 15, 2021.
Boyce (Intel) J: "BoG Report on General High Level Syntax", 126. MPEG Meeting; Mar. 19, 2019-Mar. 27, 2019, Geneva; (Motion Picture Expert Group or ISO/IEC JTC1/SC29/WG11), No. m47737, Mar. 25, 2019 (Mar. 25, 2019), XP030211954, 20 pages, Retrieved from the Internet: URL: http://phenix.int-evry.fr/mpeg/doc_end_user/documents/126_Geneva/wg11/m47737-JVET-N0724-v6-JVET-N0724-v6.zip JVET-N0724-v5.docx [retrieved on Mar. 25, 2019] section "1.1.1.6-6.18.4 Low latency random access (10)", subsection "JVET-N0072 AHG17: New NAL, unit types for VVC [L. Chen, C.-W. Hsu, Y.-W. Huang, S.-M. Lei (MediaTek) ]" section "1.1.1. 6-6.18.4 Low latency random access (10)", subsection "JVET-N0101 AHG14/AHG17: On Gradual and Clean Random Access [S. Deshpande (Sharp) ] ".

* cited by examiner

SUBPICTURE SIGNALING IN VIDEO CODING

This application claims priority to U.S. Provisional Application No. 62/984,895, filed Mar. 4, 2020, and U.S. Provisional Application No. 63/003,710, filed Apr. 1, 2020, the entire contents of both of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for subpicture signaling in video coding. More particularly, this disclosure describes a number of subpicture and other syntax and signaling techniques that may be improvements over existing techniques. For example, the techniques of this disclosure may reduce signaling overhead by reducing or eliminating unnecessary signaling.

In one example, a method of coding video data includes determining whether a sequence parameter set of the video data refers to a video parameter set, based on the sequence parameter set not referring to the video parameter set, determining a value of a first syntax element to be indicative of a profile-tier-layer structure being signaled in the sequence parameter set, and coding the video data based on the profile-tier-layer structure.

In another example, a method includes determining whether there is no network abstraction layer (NAL) unit with a NAL unit header type of a gradual decoding refresh NAL unit type in an output layer set, based on there being no NAL unit with the NAL unit header type of the gradual decoding refresh NAL unit type in the output layer set, determining a value of a first syntax element to indicate gradual decoder refresh pictures are not present in a coded layer video sequence, and coding the video data of the coded layer video sequence without coding gradual decoder refresh pictures.

In another example, a device includes memory configured to store the video data and one or more processors implemented in circuitry and communicatively coupled to the memory, the one more processors being configured to: determine whether a sequence parameter set of the video data refers to a video parameter set; based on the sequence parameter set not referring to the video parameter set, determine a value of a first syntax element to be indicative of a profile-tier-layer structure being signaled in the sequence parameter set; and code the video data based on the profile-tier-layer structure.

In another example, a device includes memory configured to store the video data and one or more processors implemented in circuitry and communicatively coupled to the memory, the one more processors being configured to: determine whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determine a value of a first syntax element to indicate gradual decoder refresh pictures are not present in a coded layer video sequence; and code the video data of the coded layer video sequence without coding gradual decoder refresh pictures.

The details of one or more examples are set forth in the accompanying drawings and the description below. Other features, objects, and advantages will be apparent from the description, drawings, and claims.

DETAILED DESCRIPTION

This disclosure describes a number of subpicture and other signaling and syntax changes that may be improvements over existing techniques, such as those of some draft standards. For example, certain draft standards allow for redundant and/or unnecessary signaling of syntax elements which may increase signaling bandwidth associated with video coding over what may otherwise be needed. Furthermore, certain draft standards may include restrictions that may unnecessarily impede the ability of a video codec to meet certain requirements under certain use cases, such as viewport adaptive streaming.

According to the techniques of this disclosure, redundant and/or unnecessary signaling in such video standards may be reduced or eliminated to reduce the signaling bandwidth associated with video coding. Additionally, according to the techniques of this disclosure, restrictions may be altered to improve the ability of a video codec to meet the requirements of certain use cases, such as viewport adaptive streaming.

Figure 1:
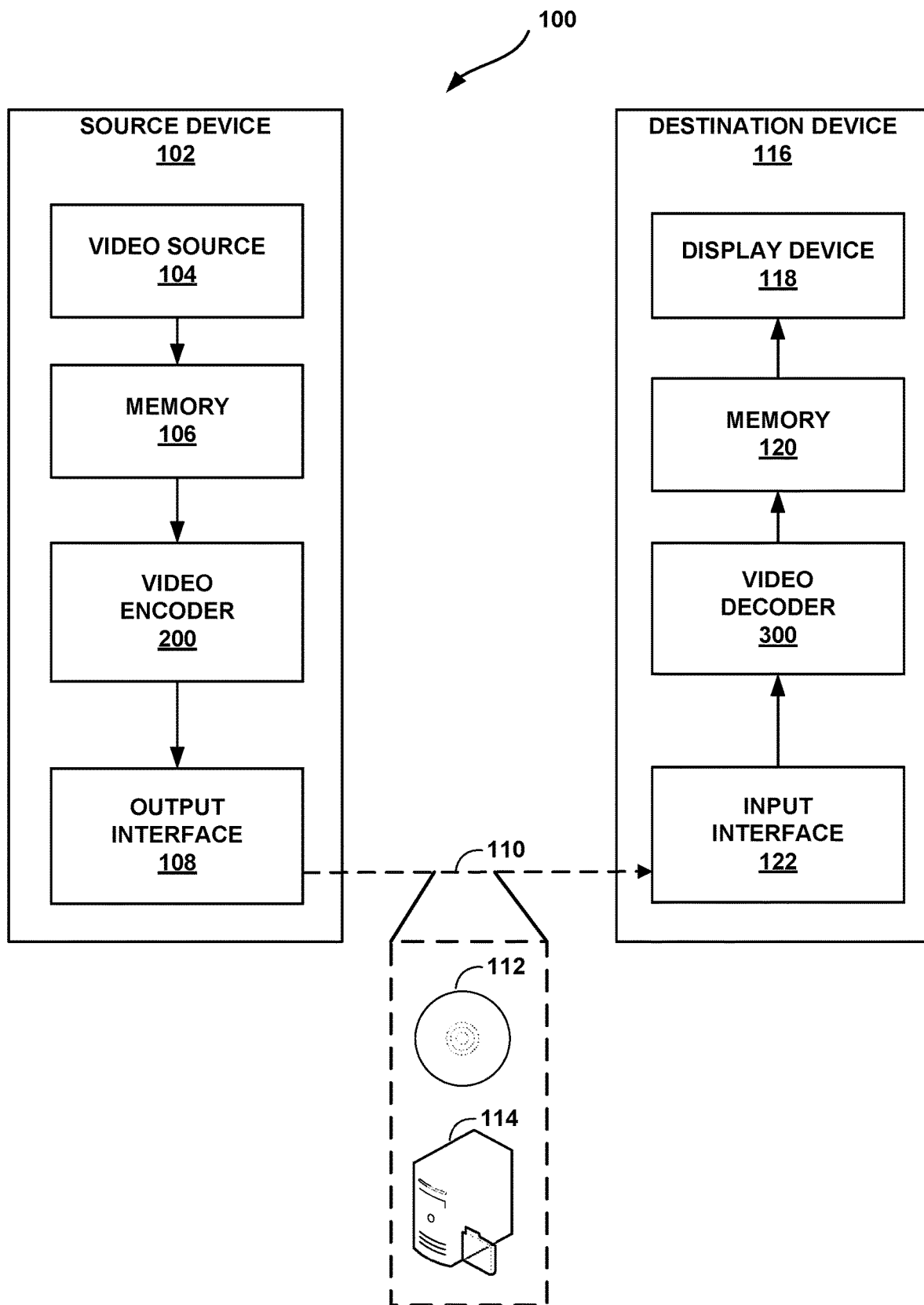
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for subpicture signaling in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for subpicture signaling in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both, that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vC (hereinafter "VVC Draft 8"). A more resent draft is described in Bross, et al. "Versatile Video Coding Editorial Refinements on Draft 10," Joint Video Experts Team (JVET) of ITU-T SG 16 WP 3 and ISO/IEC JTC 1/SC 29/WG 11, 20$^{th}$ Meeting, by teleconference, 7-16 Oct. 2020, JVET-T2001-v1. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder

300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining whether a sequence parameter set of the video data refers to a video parameter set, based on the sequence parameter set not referring to the video parameter set, determining a value of a first syntax element to be indicative of a profile-tier-layer structure being signaled in the sequence parameter set, and coding the video data based on the profile-tier-layer structure.

In another example, a method includes determining whether there is no network abstraction layer (NAL) unit with a NAL unit header type of a gradual decoding refresh NAL unit type in an output layer set, based on there being no NAL unit with the NAL unit header type of the gradual decoding refresh NAL unit type in the output layer set, determining a value of a first syntax element to indicate gradual decoder refresh pictures are not present in a coded layer video sequence, and coding the video data of the coded layer video sequence without coding gradual decoder refresh pictures.

In another example, a device includes memory configured to store the video data and one or more processors implemented in circuitry and communicatively coupled to the memory, the one more processors being configured to: determine whether a sequence parameter set of the video data refers to a video parameter set; based on the sequence parameter set not referring to the video parameter set, determine a value of a first syntax element to be indicative of a profile-tier-layer structure being signaled in the sequence parameter set; and code the video data based on the profile-tier-layer structure.

In another example, a device includes memory configured to store the video data and one or more processors implemented in circuitry and communicatively coupled to the memory, the one more processors being configured to: determine whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determine a value of a first syntax element to indicate gradual decoder refresh pictures are not present in a coded layer video sequence; and code the video data of the coded layer video sequence without coding gradual decoder refresh pictures.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
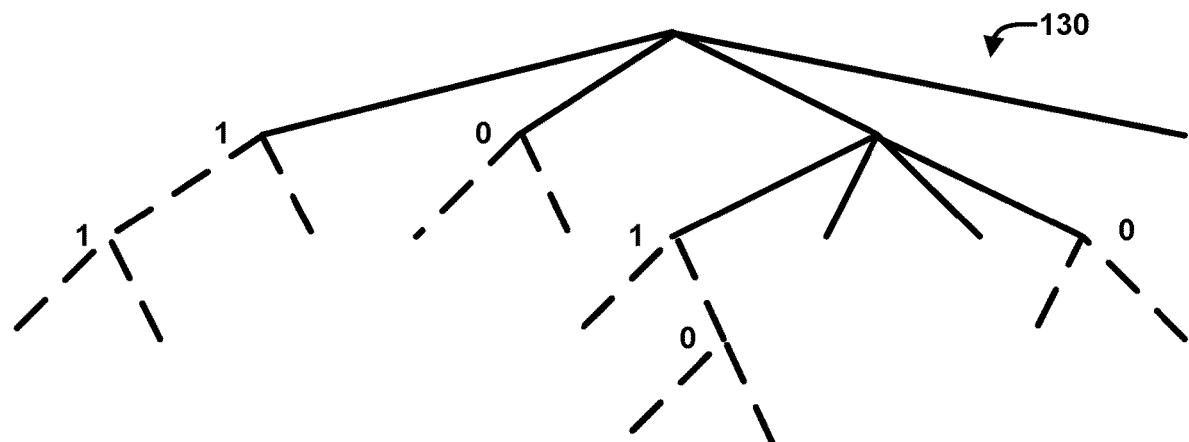
FIGS. 2A and 2B are conceptual diagrams illustrating an example quadtree binary tree (QTBT) structure, and a corresponding coding tree unit (CTU).
Figure 2B:
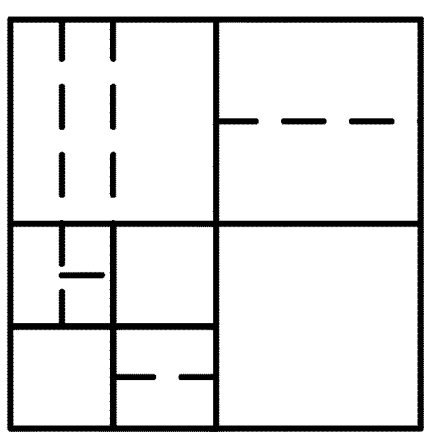

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
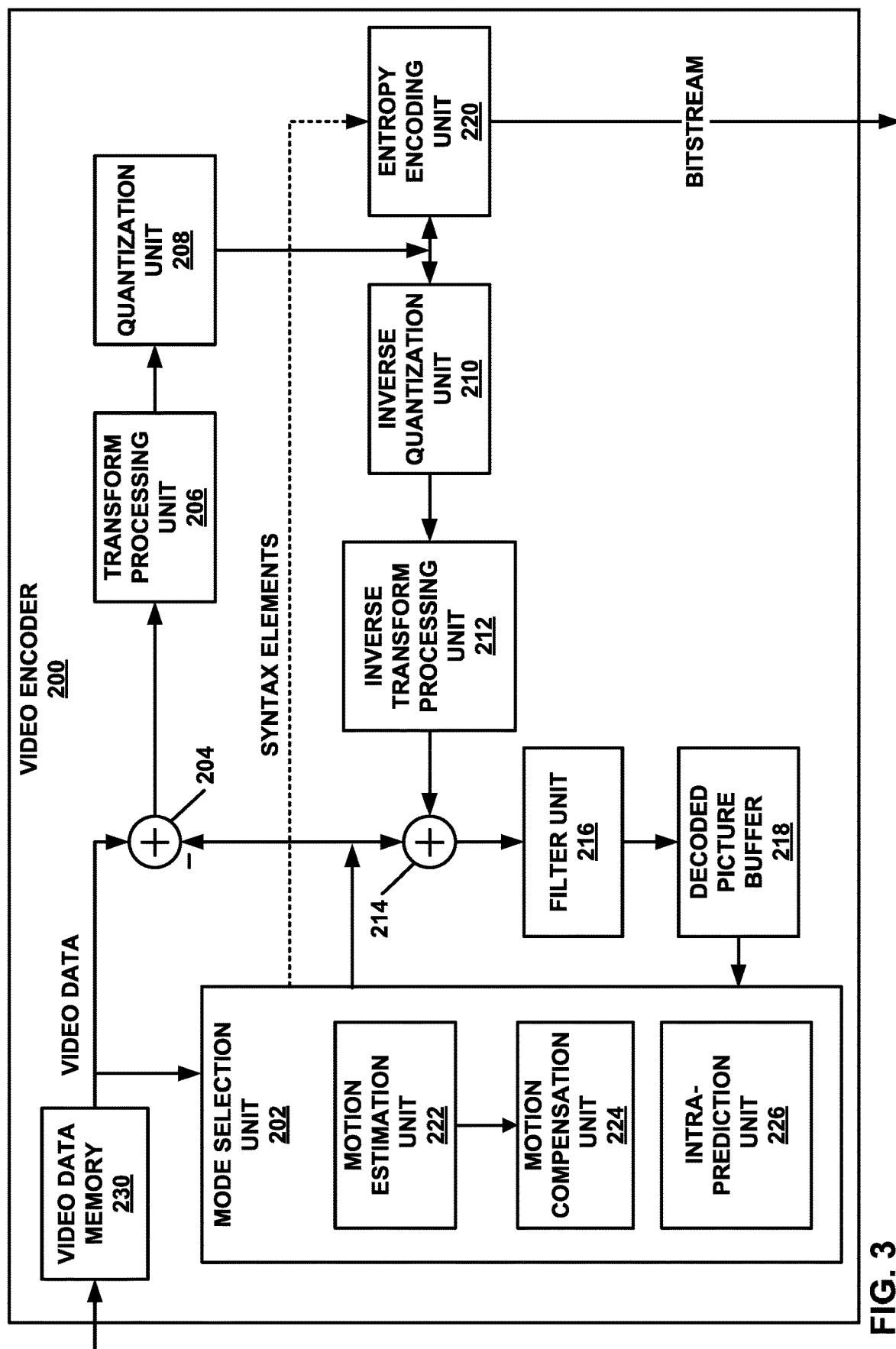
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

In some examples, mode selection unit 202 may determine parameter sets which may be encoded by entropy encoding unit 220 into a bitstream. For example, mode selection unit 202 may determine a sequence parameter set and a video parameter set.

In some examples, mode selection unit 202 may determine whether a sequence parameter set of the video data refers to a video parameter set. Based on the sequence parameter set not referring to the video parameter set, mode selection unit 202 may determine a value of a first syntax element to be indicative of a profile-tier-layer structure being signaled in the sequence parameter set.

In some examples, mode selection unit 202 may determine whether there is no network abstraction layer (NAL) unit with a NAL unit header type of a gradual decoding refresh NAL unit type in an output layer set. Based on there being no NAL unit with the NAL unit header type of the gradual decoding refresh NAL unit type in the output layer set, mode selection unit 202 may determine a value of a first syntax element to indicate gradual decoder refresh pictures are not present in a coded layer video sequence.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including memory configured to store the video data and one or more processors implemented in circuitry and communicatively coupled to the memory, the one more processors being configured to: determine whether a sequence parameter set of the video data refers to a video parameter set; based on the sequence parameter set not referring to the video parameter set, determine a value of a first syntax element to be indicative of a profile-tier-layer structure being signaled in the sequence parameter set; and encode the video data based on the profile-tier-layer structure.

Video encoder 200 also represents an example of a device configured to encode video data including includes memory configured to store the video data and one or more processors implemented in circuitry and communicatively coupled to the memory, the one more processors being configured to: determine whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determine a value of a first syntax element to indicate gradual decoder refresh pictures are not present in a coded layer video sequence; and encode the video data of the coded layer video sequence without encoding gradual decoder refresh pictures.

Figure 4:
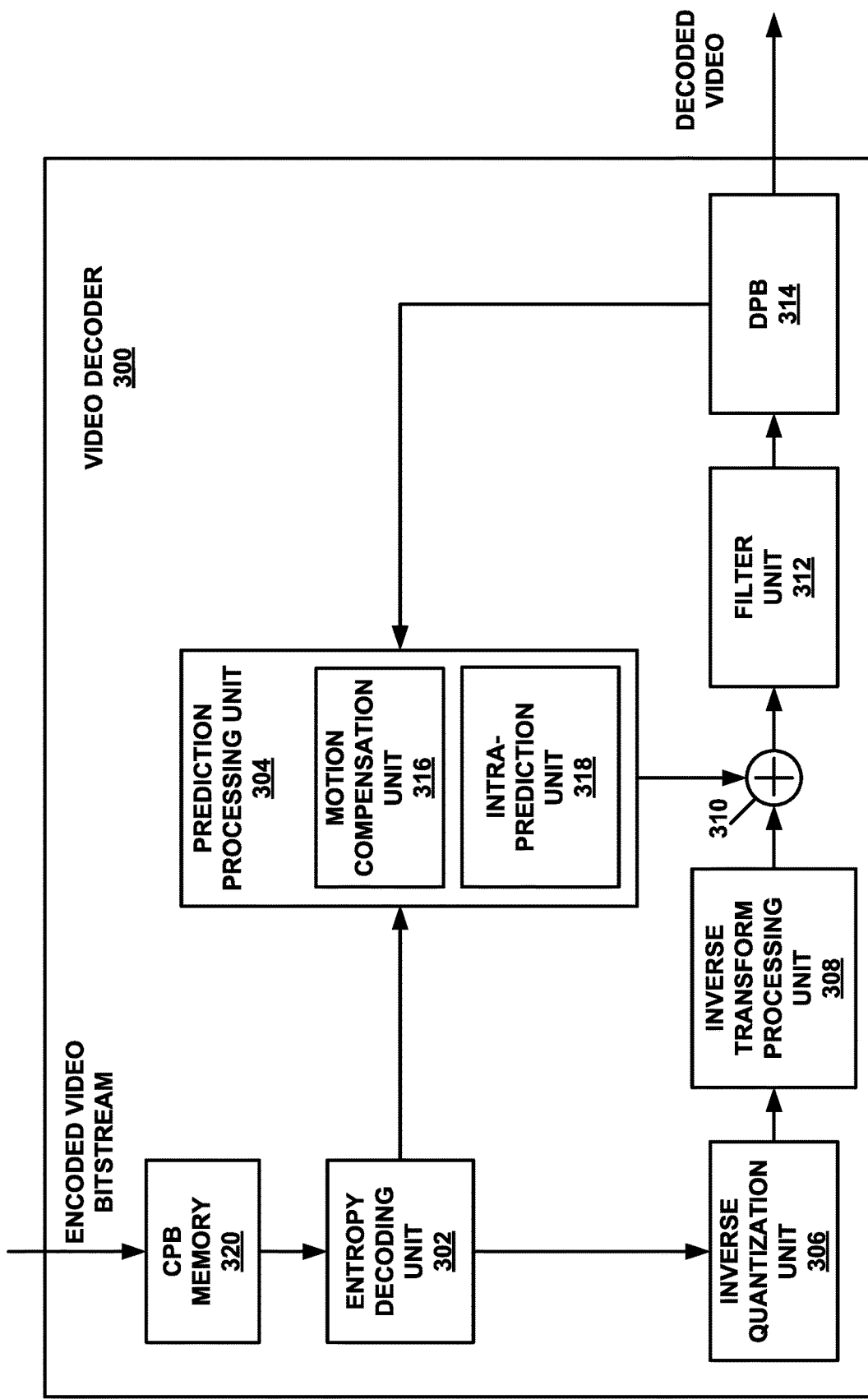
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

In some examples, entropy decoding unit 302 may decode and prediction processing unit 304 may determine parameter sets from the encoded video bitstream. For example, prediction processing unit 304 may determine a sequence parameter set and a video parameter set.

In some examples, prediction processing unit 304 may determine whether a sequence parameter set of the video data refers to a video parameter set. Based on the sequence parameter set not referring to the video parameter set, prediction processing unit 304 may determine a value of a first syntax element to be indicative of a profile-tier-layer structure being signaled in the sequence parameter set. The value of the first syntax element being indicative of a profile-tier-layer structure being signaled in the sequence parameter set may be based on the sequence parameter set not referring to the video parameter set because video encoder 200 may set the value of the first syntax element as such to meet bitstream conformance requirements.

In some examples, prediction processing unit 304 may determine whether there is no network abstraction layer (NAL) unit with a NAL unit header type of a gradual decoding refresh NAL unit type in an output layer set. Based on there being no NAL unit with the NAL unit header type of the gradual decoding refresh NAL unit type in the output layer set, prediction processing unit 304 may determine a value of a first syntax element to indicate gradual decoder refresh pictures are not present in a coded layer video sequence. The value of the first syntax element being indicative of gradual decoder refresh pictures not being present in the coded layer video sequence may be based on there being no NAL unit with the NAL unit header type of gradual decoding refresh NAL unit type in the output layer set because video encoder 200 may set the value of the first syntax element as such to meet bitstream conformance requirements.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including memory configured to store the video data and one or more processors implemented in circuitry and communicatively coupled to the memory, the one more processors being configured to: determine whether a sequence parameter set of the video data refers to a video parameter set; based on the sequence parameter set not referring to the video parameter set, determine a value of a first syntax element to be indicative of a profile-tier-layer structure being signaled in the sequence parameter set; and decode the video data based on the profile-tier-layer structure.

Video decoder 300 also represents an example of a device configured to decode video data including includes memory configured to store the video data and one or more processors implemented in circuitry and communicatively coupled to the memory, the one more processors being configured to: determine whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determine a value of a first syntax element to indicate gradual decoder refresh pictures are not present in a coded layer video sequence; and decode the video data of the coded layer video sequence without encoding gradual decoder refresh pictures.

As mentioned above, this disclosure describes techniques for improving signaling in video coding over existing techniques. These existing techniques may be techniques set forth in a draft of the versatile video coding (VVC) standard. VVC has been developed by a Joint Video Experts Team (WET) of ITU-T and ISO/IEC to achieve substantial compression capability beyond HEVC for a broadened range of applications. VVC Draft 8 specifies normative bitstream and picture formats, high level syntax (HLS) and semantics, and the parsing and decoding process. VVC Draft 8 also specifies profiles/tiers/levels (PTL) restrictions, byte stream format, a hypothetical reference decoder and supplemental enhancement information (SEI) in the annex.

VVC Draft 8 inherits a number of high-level features from HEVC, such as network abstraction layer (NAL) unit and parameter set concepts, tile and wave-front parallel processing, layered coding and the use of SEI messages for supplemental data signaling. Additional new high-level features are included in VVC Draft 8, including rectangular slice and subpicture concepts, picture resolution adaptation, mixed NAL unit types, picture header, gradual decoding refresh (GDR) picture, virtual boundary, and the reference picture list (RPL) for reference picture management.

The subpicture concept is supported in VVC Draft 8 to address the 360-degree video applications such as viewport dependent streaming as specified in ISO/IEC JTC1/SC29/WG11 N19042, "Text of ISO/IEC DIS 23090-2 $2^{nd}$ edition OMAF", January 2020 (hereinafter "OMAF"). OMAF stands for omnidirectional media format.

A picture may be divided into one or more tile rows and one or more tile columns. A tile is a sequence of CTUs that covers a rectangular region of a picture. A raster-scan slice contains a sequence of complete tiles in a tile raster scan of a picture. A rectangular slice contains either a number of complete tiles that collectively form a rectangular region of the picture or a number of consecutive complete CTU rows of one tile that collectively form a rectangular region of the picture. A subpicture contains one or more rectangular slices that collectively cover a rectangular region of a picture.

Consequently, each subpicture boundary is also a slice boundary, and each vertical subpicture boundary is also a vertical tile boundary.

Figure 5:
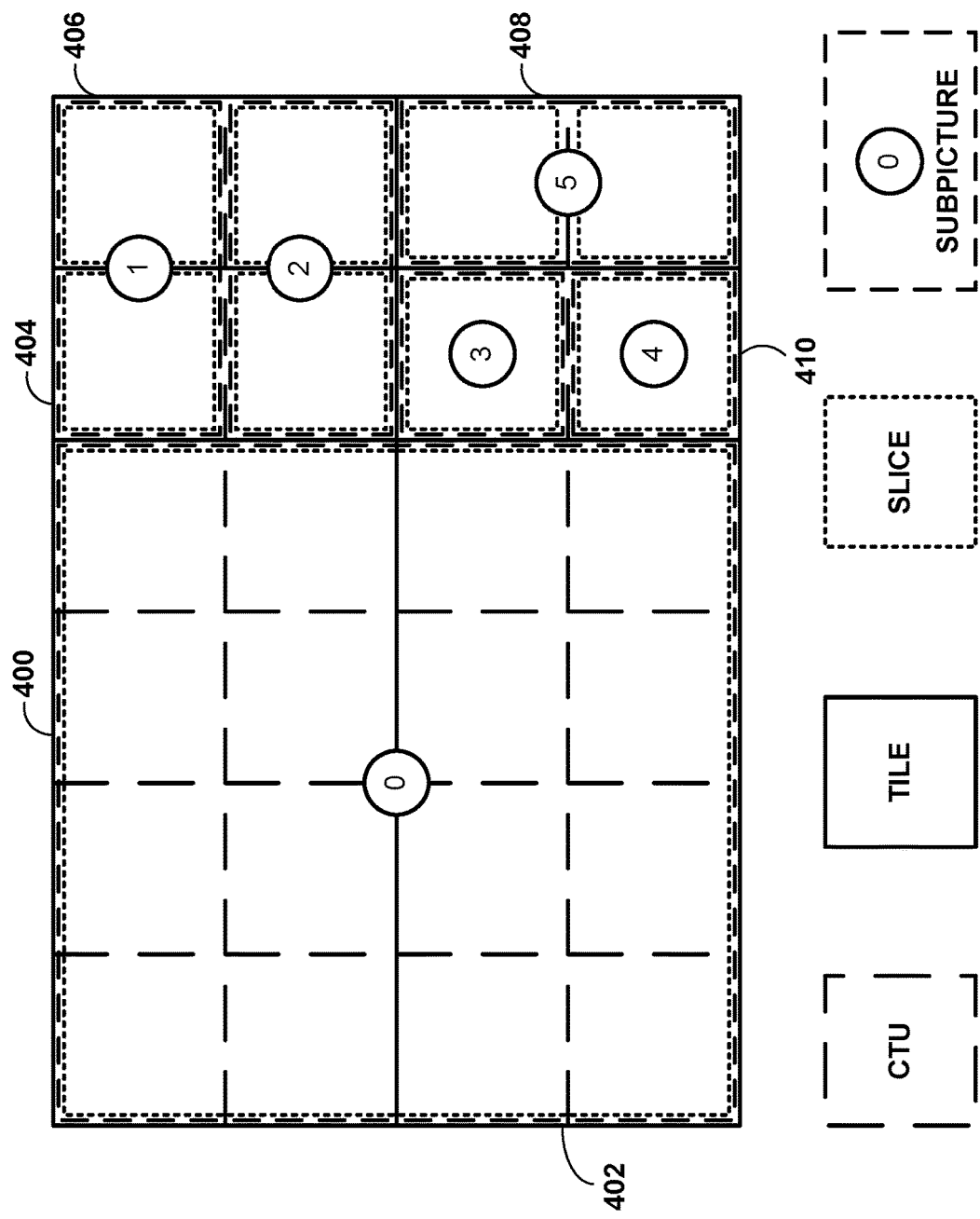
FIG. 5 is a conceptual diagram illustrating a picture that is partitioned into 6×4 CTUs, 3×2 tiles, 9 slices and 6 subpictures.

FIG. 5 is a conceptural diagram illustrating an example of subpicture partitioning of a picture. In the example of FIG. 5, a CTU is represented by long dashed lines, a tile is represented by solid line, a slice is represented by dotted lines and a subpicture is represented by medium dashed lines. In this example, a where a picture contains 4×6 CTUs and is partitioned into 6 tiles (400, 402, 404, 406, 408 ands 410), 2 tiles (400 and 402) on the left-hand side covering one slice of 16 CTUs, 4 tiles (404, 406, 408 and 410) on the right-hand side each covering 2 vertically-stacked slices of 1×2 CTUs, altogether resulting in 9 slices and 6 subpictures.

Video encoder 200 may explicitly signal a subpicture layout in an SPS on a CTU basis. In VVC Draft 8, picture resolution changes in a coded layer-wise video sequence (CLVS) is not supported when subpictures are used. Video encoder 200 may signal the subpicture identifier (ID) mapping in the SPS or the PPS, but not both. When video encoder 200 does not explicitly signal the subpicture ID, video decoder 300 may use the subpicture index as the subpicture ID.

When subpictures are available, a slice header carries a slice_subpic_id syntax element to identify the subpicture that contains the slice, and slice_address is the subpicture-level slice index. The picture-level slice index and the subpicture-level slice index may be aligned such that the picture-level slice index and the subpicture-level slice index are in the order that corresponds to the decoding order.

The shapes of the slice and subpictures of a picture may be such that each CTU, when decoded, has the CTU's entire left boundary and entire top boundary that are either picture boundaries or are boundaries of previously decoded CTU(s).

When a picture is coded using three separate color planes (separate_colour_plane_flag is equal to 1), a slice contains only CTUs of one color component being identified by the corresponding value of a colour_plane_id syntax element. Video encoder 200 may interleave coded slices with different values of colour_plane_id within a picture with each other under the constraint that for each value of colour_plane_id, the coded slice NAL units with that value of colour_plane_id may be in the order of increasing CTU address in tile scan order for the first CTU of each coded slice NAL unit.

A number of drawbacks of VVC Draft 8's subpicture design are now discussed. On such drawback is subpicture present signaling. VVC Draft 8 requires a video encoder, such as video encoder 200, to always signal a subpicture present flag in the SPS and keep a subpicture layout static over a CLVS. Since a subpicture is not allowed when picture resolution change is enabled in CLVS, the subpicture present flag may be conditioned. In future versions of a VVC video codec, the subpicture layout signaling may be designed to handle picture resolution changes.

Subpicture ID mapping signaling is now discussed. According to VVC Draft 8, a video encoder, such as video encoder 200, may signal a subpicture ID syntax element in either the SPS or the PPS and a slice header carries a subpicture ID to identify the subpicture that contains the slice. Video encoder 200 may signal a subpicture mapping ID in the PPS to address subpicture extraction and reposition scenarios. In this case, video encoder 200 may signal the IDs of all subpictures in the PPS from time to time even though the position and ID of a majority of subpictures are consistent, for example, not reordered, during viewport dependent streaming cases. It may be beneficial to signal the IDs for only those subpictures whose order (e.g., display order, decoding order, or other order) is changed to save signaling bits (reduce signaling overhead) for common cases. In other words, in order to save signaling bits, video encoder 200 may only signal subpicture IDs and/or subpicture mapping IDs for those subpictures whose order is changed.

Loop filtering across subpictures is now discussed. Loop filtering may be used to reduce blocking distortion. The semantics of loop_filter_across_subpic_enabled_flag[i], a syntax element indicative of whether loop filtering across subpictures is enabled, is as follows. loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1−sps_independent_subpics_flag. Thus, if loop_filter_across_subpic_enabled_pic_flag[i] is not present in a bitstream, video decoder 300 may infer the value of loop_filter_across_subpic_enabled_pic_flag[i] to be equal to 1−sps_independent_subpics_flag. sps_independent_subpics_flag is indicative of whether all subpicture boundaries in the CLVS are treated as picture boundaries and whether loop filtering across subpicture boundaries is permitted.

Loop filtering does not apply to subpicture boundaries when all subpictures are independently coded. However, loop filtering may or may not apply to a subpicture boundary when an individual subpicture is independently coded. The loop_filter_across_subpic_enabled_flag[i] may be conditioned by subpic_treated_as_pic_flag[i] to be consistent. subpic_treated_as_pic_flag[i] may be indicative of whether the i-th subpicture of each coded picture in the CLVS is treated as a picture in the decoding process excluding in-loop filtering operations.

Profile-tier-level (PTL) signaling in an SPS is now discussed. The value of the syntax element sps_ptl_dpb_hrd_params_present_flag in an SPS may be 0 or 1 in the VVC Draft 8 without constraint. sps_ptl_dpb_hrd_params_present_flag may be indicative of whether a profile_tier_level( ) syntax structure and a dpb_parameters( ) syntax structure are present in the SPS, and a general_timing_hrd_parameters( ) syntax structure and an ols_timing_hrd_parameters( ) syntax structure may also be present in the SPS. When sps_video_parameter_set_id is equal to 0, the SPS does not refer to a video parameter set (VPS) and the coded video sequence (CVS) contains only one layer. The PTL syntax structure is presented in the SPS when no VPS is referred to when decoding each CLVS referring to the SPS.

A picture header in a slice header is now discussed. VVC Draft 8 allows a slice header (SH) to carry a picture header (PH) syntax structure without constraint. The original motivation for this allowance was to merge the PH and the SH for common cases, such as where there is one slice per picture. However, a bitstream conformance requirement may be desirable to restrict PHs in SHs to avoid having the PH syntax structure duplicated in multiple SHs. An additional benefit to allow PH in SH for the single slice per picture case is to allow easy picture boundary detection since PH repetition is prohibited in VVC Draft 8. In addition, the content of a PH syntax structure may be constrained for multiple coded slices.

PPS ID length is now discussed. VVC Draft 8 specifies PPS ID data type in ue(v) (e.g., variable length) which is the same as is specified in HEVC. Although SPS ID data type was ue(v) in HEVC, SPS ID data type was changed to u(4) (e.g., four bits) in VVC Draft 8. Since the value of pps_pic_parameter_set_id shall be in the range of 0 to 63, inclusive according to VVC Draft 8, it may be beneficial to define PPS ID data type in u(6) (e.g., six bits) to simplify the PPS parsing process.

General level limits on a tile column is now discussed. The maximum number of tile columns is less than the maximum number of tile rows in general tier and level limits according to HEVC and VVC Draft 8 as shown in Table 1. VVC Draft 8 constrains each subpicture boundary to always be a slice boundary, and each vertical subpicture boundary to always be a vertical tile boundary. For an equirectangular projected picture, a subpicture may cover a minimum azimuth range of 18-degrees given MaxTileCols 20, while a subpicture may cover an elevation range of 8-degrees given MaxTileRows 22, or an even smaller elevation region since the minimum subpicture height may be equal to a CTU row height. It may be desirable to increase MaxTileCols to fulfill the viewport adaptive streaming requirement.

TABLE 1

General tier and level limits

| Level | Max luma picture size MaxLuma Ps (samples) | Max CPB size MaxCPB (CpbVclFactor or CpbNalFactor bits) Main tier | High tier | Max slices per picture MaxSlices PerPicture | Max # of tile rows MaxTile Rows | Max # of tile columns MaxTile Cols |
|---|---|---|---|---|---|---|
| 1 | 36 864 | 350 | — | 16 | 1 | 1 |
| 2 | 122 880 | 1 500 | — | 16 | 1 | 1 |
| 2.1 | 245 760 | 3 000 | — | 20 | 1 | 1 |
| 3 | 552 960 | 6 000 | — | 30 | 2 | 2 |
| 3.1 | 983 040 | 10 000 | — | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

This disclosure describes a number of subpicture and other signaling and syntax changes that may be improvements on VVC Draft 8. One such improvement may be to the subpicture present flag. VVC Draft 8 specifies the value of subpic_info_present_flag, which is indicative of whether subpicture information is present, shall be equal to 0 when res_change_in_clvs_allowed_flag is equal to 1. It may be desirable to condition the presence of subpic_info_present_flag by res_change_in_clvs_allowed_flag as shown in Table 2. The beginning of changes to VVC Draft 8 are marked with <CHANGE> and the end of changes are marked with </CHANGE>.

TABLE 2

| Proposed condition on subpic_info_present_flag | |
|---|---|
| | Descriptor |
| seq_parameter_set_rbsp( ) { | |
| ... | |
|   res_change_in_clvs_allowed_flag | u(1) |
| ... | ue(v) |
|   sps_log2_ctu_size_minus5 | u(2) |
|   <CHANGE> if ( !res_change_in_clvs_allowed_flag ) { </CHANGE> | |
|     subpic_info_present_flag | u(1) |
|     if( subpic_info_present_flag ) { | |
|       sps_num_subpics_minus1 | ue(v) |
|       ... | |
|     } | |
|   <CHANGE> } </CHANGE> | |
| ... | |
| } | |

The semantics of subpic_info_present_flag may be updated in VVC Draft 8 as follows. The beginning of changes are marked with <CHANGE> and the end of changes are marked with </CHANGE>.

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS. <CHANGE> When not present, the value of subpic_info_present_flag is inferred to be equal to 0. </CHANGE>

For example, if subpic_info_present_flag is not present, video decoder 300 may infer subpic_info_present_flag to be 0.

In case both a resolution change and subpicture are supported in the future, the VVC Draft 8 static subpicture layout signaling method may not be sufficient. This disclosure describes an additional flag in the SPS that may indicate whether the subpicture info syntax structure is signaled in the SPS or the PPS when the SPS subpic_info_present_flag is equal to 1. When the subpicture info syntax structure is signaled in the PPS, the length of the syntax elements of the top-left position of each subpicture is based on the ceiling functions Ceil(Log 2((pic_width_in_luma_samples+CtbSizeY−1)>>CtbLog 2SizeY)) and Ceil(Log 2((pic_height_in_luma_samples+CtbSizeY−1)>>CtbLog 2SizeY)) bits.

In another example, an override flag may be signaled in the PPS to override the values of subpicture layout and the properties of the syntax elements in the PPS.

Figure 6:
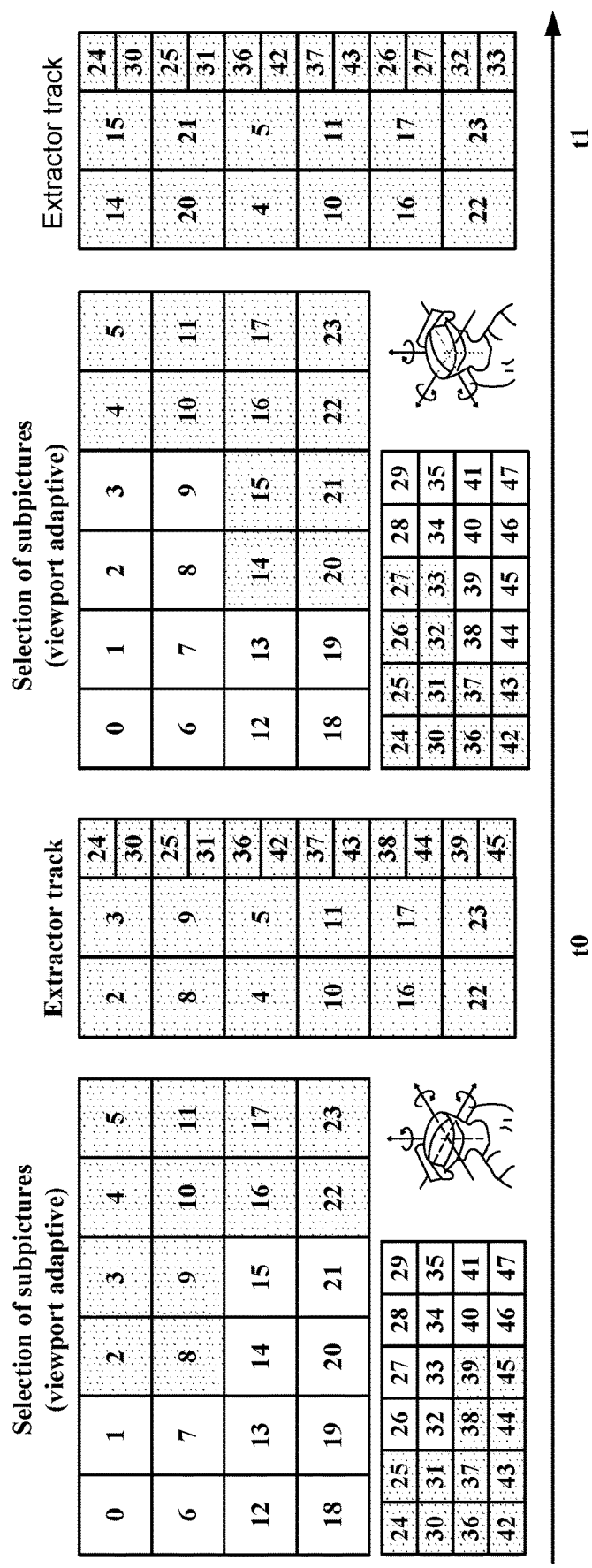
FIG. 6 is a conceptual diagram illustrating an example viewport dependent omnidirectional media format (OMAF).

Subpicture ID mapping signaling is now discussed. For viewport adaptive streaming, video encoder 200 or video decoder 300 may update a subset of subpictures to match viewing orientation changes and such a change may be subtle in general. FIG. 6 is a conceptual diagram illustrating an OMAF viewport dependent example. In the example of FIG. 6, video decoder 300 may extract and merge high-resolution subpictures and low-resolution subpictures to match the viewing orientation at time t1. At time t2, the viewer orientation changes, high-resolution subpictures #14, #15, #20 and #21 replace previous high-resolution subpictures #2, #3, #8 and #9 and low-resolution subpictures #26, #27, #32 and #34 replace previous low-resolution subpictures #38, #39, #44, and #45 accordingly in the extractor track. Only 8 out 24 subpictures are replaced in this example. The percentage of subpictures that are replaced may depend on the subpicture partitioning granularity and the viewing orientation moving speed.

According to VVC Draft 8, video encoder 200 signals all subpicture IDs in the PPS for dynamic subpicture changes. Given that there may be 96 subpictures in a picture and a maximum of 64 PPSs, a reduction in signaling overhead may be desirable.

This disclosure describes a subpicture ID override scheme to signal subpicture ID mapping in the SPS and override some or all IDs in the PPS. The beginning of deletions to the VVC Draft 8 are marked with <DELETE> and the end of deletions are marked with </DELETE>. The beginning of other changes are marked with <CHANGE> and the end of changes are marked with </CHANGE>.

TABLE 3

Proposed PPS subpicture ID override

| | Descriptor |
|---|---|
| pic_parameter_set_rbsp( ) { | |
| ... | |
|    <DELETE> subpic_id_mapping_in_pps_flag </DELETE> <CHANGE> pps_subpic_id_override_enable_flag </CHANGE> | u(1) |
|    <CHANGE> if( subpic_id_override_enable_flag ) { </CHANGE> | |
|       pps_num_subpics | ue(v) |
|       pps_subpic_id_len_minus1 | ue(v) |
|       <CHANGE> pps_subpic_idx_present_flag </CHANGE> | u(1) |
|       for( i = 0; < DELETE>i <= pps_num_subpic_minus1 </DELETE> <CHANGE> i < pps_num_subpics </CHANGE>; i++ ) { | |
|          <CHANGE> if( pps_subpic_idx_present_flag ) pps_subpic_idx[ i ] </CHANGE> | u(v) |
|          pps_subpic_id[ i ] | u(v) |
|       } | |
|    <CHANGE> } </CHANGE> | |
| ... | |
| } | | pps_subpic_id_override_enable_flag equal to 1 specifies the presence of pps_num_subpics_minus1, pps_subpic_id_len_minus1 and pps_subpic_idx_present_flag in the PPS. pps_subpic_id_override_enable_flag equal to 0 specifies the absence of pps_num_subpics_minus1, pps_subpic_id_len_minus1 and pps_subpic_idx_present_flag in the PPS.

pps_num_subpics specifies the number of subpictures IDs explicitly signalled in the PPS. When not present, the value of pps_num_subpics is inferred to be equal to 0.

pps_subpic_idx_present_flag equal to 1 specifies the presence of pps_subpic_idx[i] in the PPS. pps_subpic_idx_present_flag equal to 0 specifies the absence of pps_subpic_idx[i] in the PPS.

pps_subpic_idx[i] specifies the index of i-th subpicture. When not present, the value of pps_subpic_idx[i] is inferred to be equal to i. The length of pps_subpic_idx[i] syntax element is Ceil(Log 2(pps_num_subpics)) bits.

pps_subpic_id[i] specifies the subpicture ID of the (pps_subpic_idx[i])-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

for(i=0; i<=sps_num_subpics_minus1; i++)
      SubpicIdVal[i]=subpic_id_mapping_in_sps_flag ? sps_subpic_id[i]:i
   if (pps_subpic_id_override_enable_flag)
      for(i=0; i<pps_num_subpics; i++)
         SubpicIdVal[pps_subpic_idx[i]]=pps_subpic_id[i]

In another example, the subpicture index may not be signaled. Video encoder 200 may signal the first N subpicture IDs in which the (N−1)th subpicture ID is the last subpicture whose ID is changed in the PPS.

The proposed subpicture ID mapping override syntax is shown in Table 4. The beginning of changes are marked with <CHANGE> and the end of changes are marked with </CHANGE>

TABLE 4

Proposed PPS syntax

| | Descriptor |
|---|---|
| pic_parameter_set_rbsp( ) { | |
|    ... | |
|    subpic_id_mapping_<CHANGE>override</CHANGE>_in_pps_flag | u(1) |

TABLE 4-continued

| Proposed PPS syntax | |
|---|---|
| | Descriptor |
| if( subpic_id_mapping_<CHANGE>override</CHANGE>_in_pps_flag ) { | |
|   pps_num_subpics_minus1 | ue(v) |
|   pps_subpic_id_len_minus1 | ue(v) |
|   for( i = 0; i <= pps_num_subpic_minus1; i++) | |
|     pps_subpic_id[ i ] | u(v) |
| } | |
| no_pic_partition_flag | u(1) |
| if( !no_pic_partition_flag ) { | | subpic_id_mapping_<CHANGE>override</CHANGE>_in_pps_flag equal to 1 specifies the presence of subpicture ID mapping syntax elements in PPS. subpic_id_mapping_<CHANGE>override</CHANGE>_in_pps_flag equal to 0 specifies the absence of subpicture ID mapping syntax elements in PPS. pps_num_subpics_minus1 <CHANGE> plus 1 specifies the number of subpictures IDs present in the PPS.</CHANGE> pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
    if( subpic_id_mapping_explicitly_signalled_flag )
        SubpicIdVal[ i ] = (
subpic_id_mapping_<CHANGE>override</CHANGE>_in_pps_flag
<CHANGE>&& (i <= pps_num_subpics_minus1 )</CHANGE>) ?
            pps_subpic_id[ i ] : sps_subpic_id[ i ]
    (80)
    else
        SubpicIdVal[ i ] = i
```

Loop filtering across subpictures is now discussed. This disclosure describes conditioning the signaling of loop_filter_across_subpic_enabled_flag[i] by subpic_treated_as_pic_flag[i] as shown in Table 5. The beginning of changes to VVC Draft 8 are marked with <CHANGE> and the end of changes are marked with </CHANGE>.

The semantics of loop_filter_across_subpic_enabled_flag[i] may be updated as follows. The beginning of deletions to VVC Draft 8 are marked with <DELETE> and the end of deletions are marked with </DELETE>. The beginning of other changes are marked with <CHANGE> and the end of changes are marked with </CHANGE>.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to <DELETE>1−sps_independent_subpics_flag</DELETE><CHANGE>0</CHANGE>.

For example, when loop_filter_across_subpic_enabled_pic_flag[i] is not present, video decoder 300 may infer loop_filter_across_subpic_enabled_pic_flag[i] to be 0.

An SPS PTL signaling constraint is now discussed. Some draft video coding standards, for example, VVC Draft 8, a bitstream may or may not contain a VPS. When a VPS is not present in a bitstream, a PTL structure may not be signaled at all. To avoid such a case, according to the techniques of this disclosure, a value of sps_ptl_dpb_hrd_params_present_flag equal to 1 is required to have PTL structure signaled in the SPS, when a VPS is not present. In other words, video encoder 200 may set the value of sps_ptl_dpb_hrd_params_present_flag equal to 1 and signal a PTL structure in the SPS.

In one example, a constraint on sps_ptl_dpb_hrd_params_present_flag is imposed as follows: It is a requirement of

TABLE 5

| Proposed condition on loop filtering in SPS | |
|---|---|
| | Descriptor |
| seq_parameter_set_rbsp( ) { | |
|   ... | |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       ... | |
|       if( !sps_independent_subpics_flag) { | |
|         subpic_treated_as_pic_flag[ i ] | u(1) |
|         <CHANGE> if( !subpic_treated_as_pic_flag[ i ]) </CHANGE> | |
|           loop_filter_across_subpic_enabled_flag[ i ] | u(1) |
|       } | |
|     } | |
|     ... | |
| } | | bitstream conformance that the value of sps_ptl_dpb_hrd_params_present_flag is equal to 1 when sps_video_parameter_set_id is equal to 0.

For example, video encoder 200 or video decoder 300 may determine whether a sequence parameter set of the video data refers to a video parameter set. For example, video encoder 200 may determine not to signal a VPS as video encoder 200 may determine that signaling a VPS is not worth the overhead the VPS would take, for example, when the bitstream being encoded contains only one layer. Video encoder 200 may encode a syntax element indicative of whether the SPS refers to a VPS. For example, video encoder 200 may encode a value of sps_video_parameter_set_id to be 0 to indicate to video decoder 300 that the SPS does not refer to a VPS. For example, video decoder 300 may determine whether a sequence parameter set of the video data refers to a VPS by parsing a syntax element indicative of whether the SPS refers to a VPS. For example, video decoder 300 may parse sps_video_parameter_set_id and determine the value of sps_video_parameter_set_id is equal to 0 to determine that the SPS does not refer to a VPS.

Based on the sequence parameter set not referring to the video parameter set, video encoder 200 or video decoder 300 may determine a value of a first syntax element to be indicative of a profile-tier-layer structure being signaled in the sequence parameter set. Video encoder 200 or video decoder 300 may code the video data based on the profile-tier-layer structure.

In another example, video encoder 200 may signal a separate flag for PTL syntax structure presence in the SPS and the above constraint may apply to that flag.

A condition on PH syntax elements is now discussed. The semantics of no_gdr_constraint_flag is described as set forth below. The beginning of changes to VVC Draft 8 are marked with <CHANGE> and the end of changes are marked with </CHANGE>.

no_gdr_constraint_flag equal to 1 specifies that there shall be no NAL unit with nuh_unit_type equal to GDR_NUT present in OlsInScope. no_gdr_constraint_flag equal to 0 does not impose such a constraint.

gdr_enabled_flag equal to 1 specifies that GDR pictures may be present in CLVSs referring to the SPS. gdr_enabled_flag equal to 0 specifies that GDR pictures are not present in CLVSs referring to the SPS. <CHANGE> It is a requirement of bitstream conformance that gdr_enabled_flag shall be equal to 0</CHANGE> when no_gdr_constraint_flag is equal to 1.

For example, video encoder 200 may set gdr_enabled_flag shall be equal to 0 when no_gdr_constraint_flag is equal to 1 or video decoder 300 may infer gdr_enabled_flag to be 0 when no_gdr_constraint_flag is equal to 1.

non_reference_picture_flag syntax element may be conditioned by ph_inter_slice_allowed_flag for single layer scenario. The semantics of non_reference_picture_flag is modified as set forth below. The beginning of changes to the VVC Draft 8 are marked with <CHANGE> and the end of changes are marked with </CHANGE>.

non_reference_picture_flag equal to 1 specifies the picture associated with the PH is never used as a reference picture. non_reference_picture_flag equal to 0 specifies the picture associated with the PH may or may not be used as a reference picture. <CHANGE> When not present, the value of non_reference_picture_flag is inferred to be equal to 1. </CHANGE>

For example, when non_reference_picture_flag is not present, video decoder 300 may infer non_reference_picture_flag to be equal to 1.

The described conditions on PH syntax elements are set forth in Table 6.

TABLE 6

| Proposed PH syntax | |
|---|---|
| | Descriptor |
| picture_header_structure( ) { | |
|   gdr_or_irap_pic_flag | u(1) |
|   if( gdr_or_irap_pic_flag) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   <CHANGE> if( !ph_inter_slice_allowed_flag && !sps_video_parameter_set_id) </CHANGE> | |
|     non_reference_picture_flag | u(1) |
|   ... | |
| } | |

In another example, non_reference_picture_flag syntax element may be placed at the beginning of the PH or right after picture type flag(s) (e.g., gdr_or_irap_pic_flag and gdr_pic_flag) in the PH to make it easier to drop a picture.

An all intra only flag syntax element may be signaled in the SPS to indicate slice_type shall be equal to I (intra). All intra may be used in still image coding and fast stream switching applications. The semantics of sps_all_intra_enabled_flag is described below.

sps_all_intra_enabled_flag equal to 1 specifies that slice type shall be equal to I. sps_all_intra_enabled_flag equal to 0 specifies that slice type may or may not be equal to 0.

The semantics of intra_only_constraint_flag may be modified as set forth below. The beginning of changes to VVC Draft 8 are marked with <CHANGE> and the end of changes are marked with </CHANGE>.

intra_only_constraint_flag equal to 1 specifies that <CHANGE>sps_all_intra_enabled_flag shall be equal to 1</CHANGE>. intra_only_constraint_flag equal to 0 may not impose such a constraint.

The syntax element, sps_all_intra_enabled_flag, may be used to condition the syntax elements such as ph_inter_slice_allowed_flag and non_reference_picture_flag at the PH.

For example, video encoder 200 or video decoder 300 may determine whether there is no network abstraction layer (NAL) unit with a NAL unit header type of a gradual decoding refresh NAL unit type in an output layer set. Based on there being no NAL unit with the NAL unit header type of the gradual decoding refresh NAL unit type in the output layer set, video encoder 200 or video decoder 300 may determine a value of a first syntax element to indicate gradual decoder refresh pictures are not present in a coded layer video sequence. Video encoder 200 or video decoder 300 may code the video data of the coded layer video sequence without coding gradual decoder refresh pictures.

A condition on SH syntax elements is now discussed. This disclosure describes presenting PH syntax structure in the SH only when there is one slice in a picture. Table 7 below shows the use of general constraint information to condition picture_header_in_slice_header_flag.

In another example, a SPS syntax element, sps_one_slice_per_picture, may be signaled to specify that each picture shall contain only one slice in a CLVS. sps_one_slice_per_picture may be used to condition the syntax elements such as picture_header_in_slice_header_flag.

In another example, a PPS syntax element, pps_one_slice_per_picture, may be signaled to specify that a picture referring to the PPS shall contain only one slice. pps_one_slice_per_picture may be used to condition the syntax elements num_slices_in_pic_minus1 in PPS and picture_header_in_slice_header_flag in a SH. The beginning of changes to VVC Draft 8 are marked with <CHANGE> and the end of changes are marked with </CHANGE>.

TABLE 7

Proposed SH syntax

| | Descriptor |
|---|---|
| slice_header( ) { | |
|   <CHANGE> if( one_slice_per_pic_constraint flag ) </CHANGE> | |
|     picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   ... | |
| } | |

The semantics of picture_header_in_slice_header_flag is modified as set forth below. The beginning of changes to VVC Draft 8 are marked with <CHANGE> and the end of changes are marked with </CHANGE>.

picture_header_in_slice_header_flag equal to 1 specifies that the PH syntax structure is present in the slice header. picture_header_in_slice_header_flag equal to 0 specifies that the PH syntax structure is not present in the slice header. <CHANGE>When not present, the value of picture_header_in_slice_header_flag is inferred to be equal to 0. </CHANGE>

In some examples, this disclosure describes a requirement of bitstream conformance that the content of picture_header_structure( ) shall be the same for all coded slices in a CLVS when picture_header_in_slice_header_flag is equal to 1.

PPS ID length is now discussed. pps_pic_parameter_set_id is coded with ue(v) and the semantics of pps_pic_parameter_set_id constrain the value of pps_pic_parameter_set_id to be in the range of 0 to 63, inclusive.

It may be beneficial to have consistency with other similar syntax elements, e.g., the ID for SPS and VPS. This disclosure describes coding pps_pic_parameter_set_id syntax element with a fixed length (e.g., u(6) or 6 bits).

Table 8 and Table 9 show the described changes in the PPS and PH in VVC Draft 8. The beginning of changes to VVC Draft 8 are marked with <CHANGE> and the end of changes are marked with </CHANGE>.

TABLE 8

Proposed PPS syntax

| | Descriptor |
|---|---|
| pic_parameter_set_rbsp( ) { | |
|   pps_pic_parameter_set_id | <CHANGE> |
| | u(6) |
| | </CHANGE> |
|   pps_seq_parameter_set_id | u(4) |
|   mixed_nalu_types_in_pic_flag | u(1) |
|   ... | |
| } | |

TABLE 9

Proposed PH syntax

| | Descriptor |
|---|---|
| picture_header_structure( ) { | |
|   gdr_or_irap_pic_flag | u(1) |
|   if( gdr_or_irap_pic_flag ) | |

TABLE 9-continued

Proposed PH syntax

| | Descriptor |
|---|---|
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | <CHANGE> |
| | u(6) |
| | </CHANGE> |
|   ... | |
| } | |

For example, video encoder 200 or video decoder 300 may determine a picture parameter set identifier of a picture parameter set. The picture parameter set identifier may have a fixed length of 6 bits.

General tier and level limits on MaxTileCols are now discussed. For viewport adaptive streaming, a VR client (which may include an example of video decoder 300) may request only those subpictures matching the VR client's viewport to reduce the streaming bandwidth. For example, rather than stream 360 degrees of subpictures, only the subpictures within the viewport may be streamed. When the viewport changes, the VR client may request a new subset of subpictures to cover the new areas.

Figure 7:
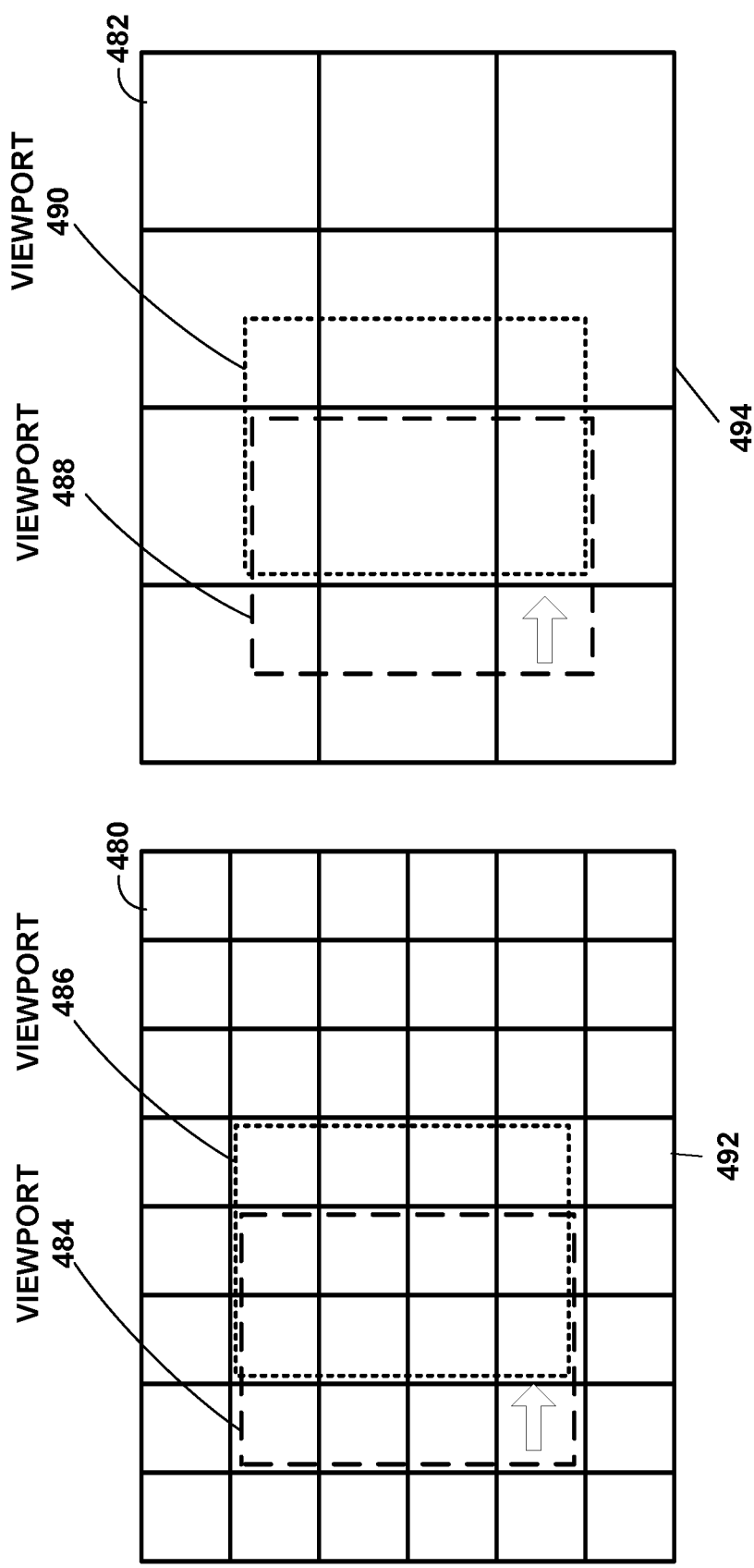
FIG. 7 is a conceptual diagram illustrating an example of viewport adaptive streaming.

FIG. 7 is a conceptual diagram illustrating an example shift from a first viewport to a second viewport. In the example of FIG. 7, a viewport may shift from viewport 484 (shown in dashed lines) to viewport 486 (shown in dotted lines) or a viewport may shift from viewport 488 (shown in dashed lines) to viewport 490 (shown in dotted lines) and the VR client may request the subset of subpictures being streamed to be changed accordingly. Two different subpicture partitionings, subpicture partitioning 480 and subpicture partitioning 482 are shown in FIG. 7. In the example of FIG. 7, subpicture partitioning 480 may consume less bandwidth as compared to subpicture partitioning 482 given the same viewport movement. This is because new subpictures in column 492 are smaller than the new subpictures in column 494 (thereby taking less bandwidth to stream) and the top and bottom subpictures in column 492 would not need to be streamed.

In some examples, according to the techniques of this disclosure, the value of MaxTileCols in general tier and level limits may be defined based on the maximal angular velocity. For example, in case of maximal angular velocity of 300-degrees per second or 10-degrees per picture at 30 fps (see OMAF), the MaxTileCols may be set up to 36 for high tiers and levels. The value of MaxTileCols may be reduced as the value may be irrelevant to the subpicture partitioning granularity.

Figure 8:
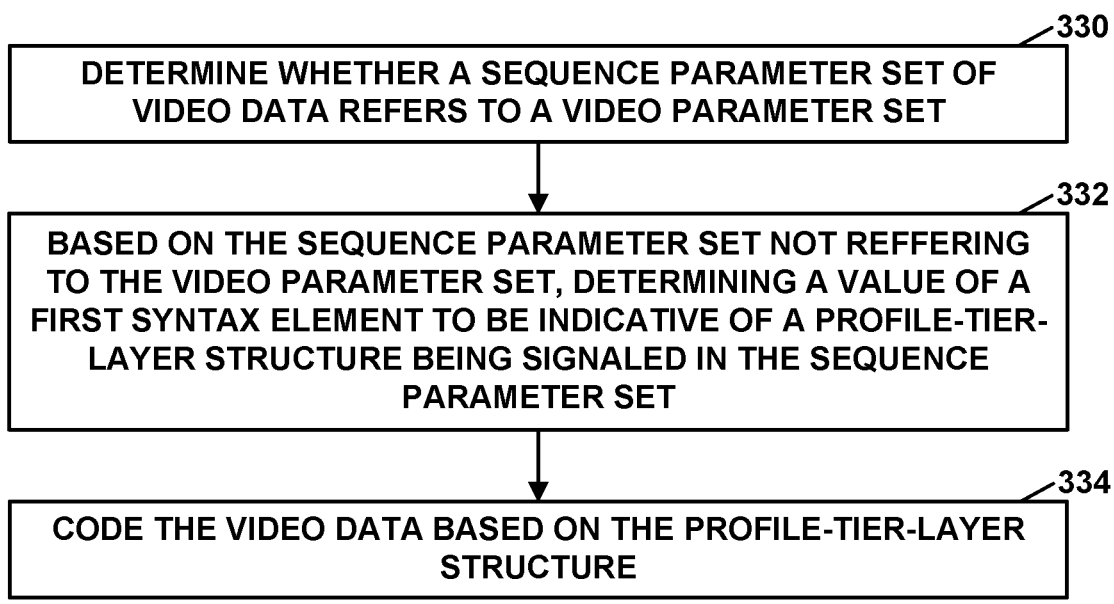
FIG. 8 is a flowchart illustrating example signaling techniques according to this disclosure.

FIG. 8 is a flowchart illustrating example signaling techniques according to this disclosure. Video encoder 200 or video decoder 300 may determine whether a sequence parameter set of video data refers to a video parameter set (330). For example, video encoder 200 may determine an SPS relating to the video data and may determine a VPS identifier as an element of the SPS. The VPS identifier may have a value that identifies a particular VPS associated with the SPS or may have a value of 0, indicating that the SPS does not refer to a VPS. For example, video encoder 200 may determine that signaling a VPS is not worth the overhead the VPS would take, for example, the VPS would not meaningfully improve the quality of any decoding of the associated video data. Video encoder 200 may encode a syntax element indicative of whether the SPS refers to a VPS. For example, video encoder 200 may encode a value of sps_video_parameter_set_id to be 0 to indicate to video decoder 300 that the SPS does not refer to a VPS.

For example, video decoder 300 may parse a VPS identifier in an SPS to determine whether the SPS refers to a VPS. The video parameter set identifier may have a value that identifies a particular video parameter set or may have a value of 0, indicating that the sequence parameter set does not refer to a video parameter set. For example, video decoder 300 may parse sps_video_parameter_set_id and determine that the value of sps_video_parameter_set_id is equal to 0 to determine that the SPS does not refer to a VPS.

Based on the sequence parameter set not referring to the video parameter set, video encoder 200 or video decoder 300 may determine a value of a first syntax element to be indicative of a profile-tier-layer structure being signaled in the sequence parameter set (332). For example, video encoder 200 may set the value of the first syntax element, (e.g., sps_ptl_dpb_hrd_params_present_flag) to equal 1, based on the SPS not referring to the video parameter set in order to comply with bitstream conformance requirements according to the techniques of this disclosure. For example, video decoder 300 may parse the first syntax element (e.g., sps_ptl_dpb_hrd_params_present_flag) to determine the value of the first syntax element (e.g., 1) is indicative of a profile-tier-layer structure being signaled in the SPS. The value of the first syntax element may be based on the SPS not referring to the video parameter set because video encoder 200 may set the value of the first syntax element to comply with bitstream conformance requirements.

Video encoder 200 or video decoder 300 may code the video data based on the profile-tier-layer structure (334). For example, video encoder 200 may encode the video data using the profile-tier-layer structure. Video encoder 200 may also signal the profile-tier-layer structure in the SPS (rather than in a VPS as the SPS does not refer to a VPS) in a bitstream to video decoder 300. Video decoder 300 may parse the SPS to determine the profile-tier-structure and may decode the video data using the profile-tier-layer structure.

In some examples, where code includes encode, video encoder 200 may signal the first syntax element in the sequence parameter set and signaling the profile-tier-layer structure in the sequence parameter set. In some examples, where code includes decode, video decoder 300 may parse the first syntax element in the sequence parameter set and parse the profile-tier-layer structure in the sequence parameter set. In some examples, video encoder 200 or video decoder 300 may further determine a picture parameter set identifier, wherein the picture parameter set identifier has a fixed length of 6 bits.

Figure 9:
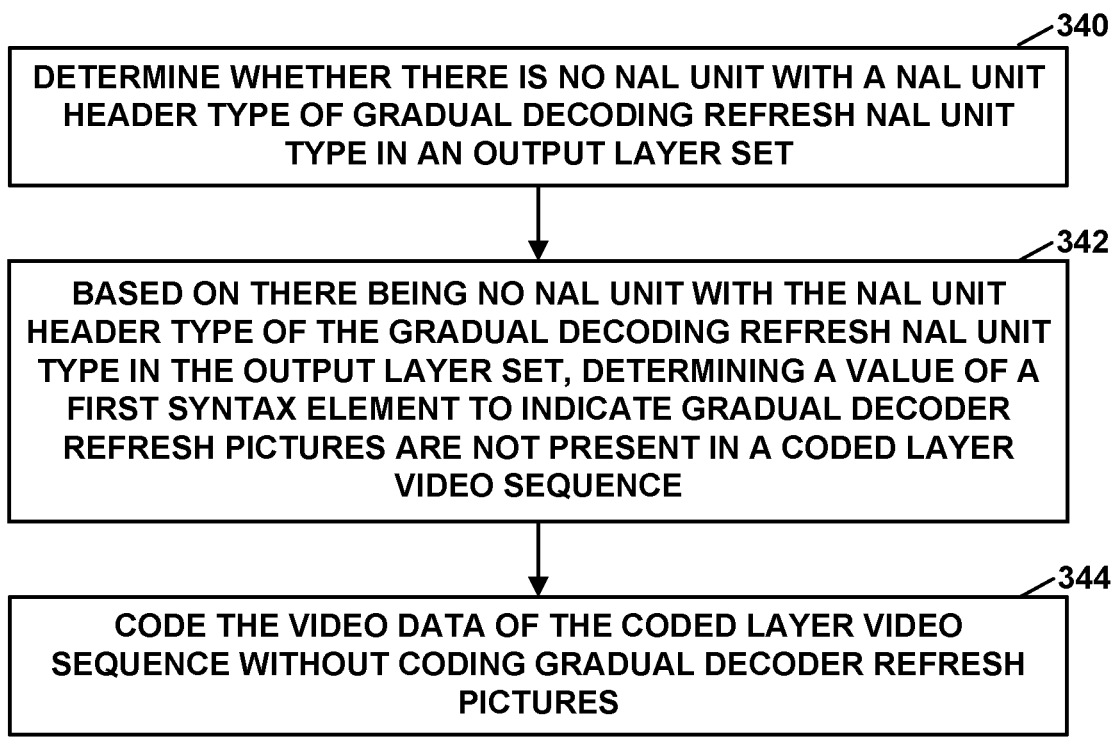
FIG. 9 is a flowchart illustrating further example signaling techniques according to this disclosure.

FIG. 9 is a flowchart illustrating further example signaling techniques according to this disclosure. Video encoder 200 or video decoder 300 may determine whether there is no network abstraction layer (NAL) unit with a NAL unit header type of a gradual decoding refresh NAL unit type in an output layer set (340). For example, video encoder 200 may perform multiple encoding passes and determine an output layer set not having any NAL units with a NAL unit header type of a gradual decoding refresh based on rate-distortion values for different parameter combinations of the multiple encoding passes. For example, video encoder 200 may determine that the best encoding pass did not include any gradual decoding refresh NAL units. For example, video decoder 300 may parse a syntax element (e.g., no_gdr_constraint_flag) to determine whether there is no NAL unit with a NAL unit header type of a gradual decoding refresh NAL unit type in an output layer set.

Based on there being no NAL unit with the NAL unit header type of the gradual decoding refresh NAL unit type in the output layer set, video encoder 200 or video decoder 300 may determine a value of a first syntax element to indicate gradual decoder refresh pictures are not present in a coded layer video sequence (342). For example, video encoder 200 may set the value of the first syntax element, (e.g., gdr_enabled_flag) to equal 0, based on there being no NAL unit with the NAL unit header type of the gradual decoding refresh NAL unit type in the output layer set to comply with bitstream conformance requirements according to the techniques of this disclosure. For example, video decoder 300 may parse the first syntax element (e.g., gdr_enabled_flag) to determine the value of the first syntax element (e.g., 0) is indicative of there being no NAL unit with the NAL unit header type of the gradual decoding refresh NAL unit type in the output layer set. The value of the first syntax element may be based on there being no NAL unit with the NAL unit header type of the gradual decoding refresh NAL unit type in the output layer set because video encoder 200 may set the value of the first syntax element to comply with bitstream conformance requirements.

Video encoder 200 or video decoder 300 may code the video data of the coded layer video sequence without coding gradual decoder refresh pictures. For example, video encoder 200 may encode the video data of the coded layer video sequence without encoding gradual decoder refresh pictures. Video decoder 300 may decode the video data of the coded layer video sequence without decoding gradual decoder refresh pictures.

In some examples, where coding includes decoding, video decoder 300 may determine whether a second syntax element indicative of whether the picture is not used as a reference picture is present in a bitstream. Based on the second syntax element not being present in the bitstream, video decoder 300 may infer the value of the second syntax element to indicate that the picture is not a reference picture.

In some examples, where coding includes encoding, video encoder 200 may determine whether a coded layer video sequence of the video data contains only one layer and determine whether an inter slice is allowed in a picture of the coded layer video sequence. Based on the coded layer video sequence containing only one layer and the inter slice being allowed, video encoder 200 may determine a value of a second syntax element indicative of whether the picture is not used as a reference picture. In some examples, where the value of the second syntax element is indicative of the picture not being used as a reference picture, video encoder 200 may refrain from signaling the second syntax element.

In some examples, video encoder 200 or video decoder 300 may determine a value of a third syntax element to indicate that all slices in a sequence are intra slices; and based on all slices in the sequence being intra slices, code all slices in the sequence using intra prediction. In some examples, where code includes decode, video decoder may determine the value of the third syntax element by parsing the third syntax element. In some examples, where code includes encode, video encoder 200 may signal the third syntax element in an SPS. In some examples, video encoder 200 or video decoder 300 may determine a value of a fourth syntax element to indicate an intra only constraint is applied, wherein determining the value of the third syntax element is based on the intra only constraint being applied. In some examples, video encoder 200 or video decoder 300 may determine a picture parameter set identifier, wherein the picture parameter set identifier has a fixed length of 6 bits.

Figure 10:
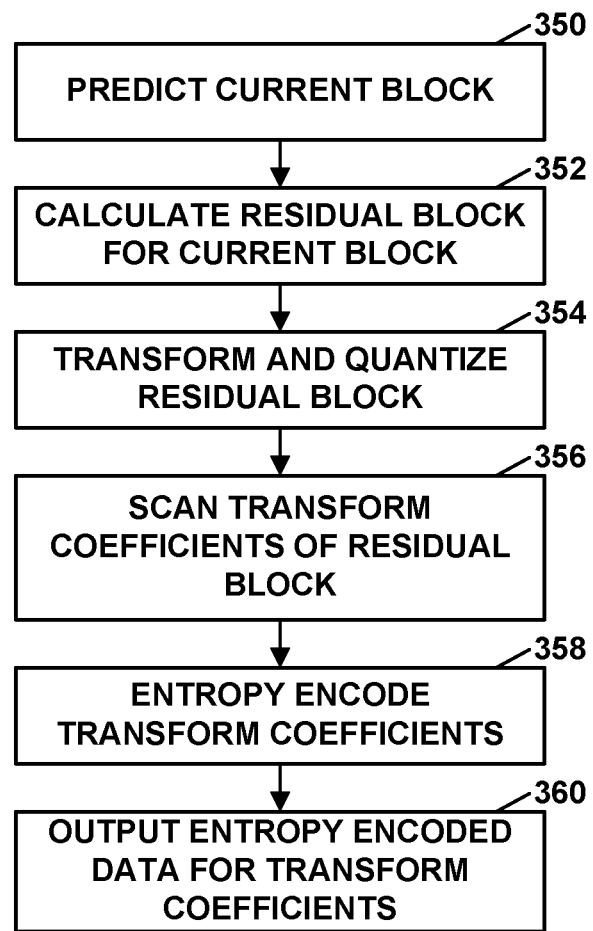
FIG. 10 is a flowchart illustrating an example of video encoding.

FIG. 10 is a flowchart illustrating an example method for encoding a current block. The current block may comprise a current CU. Although described with respect to video encoder 200 (FIGS. 1 and 3), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. As part of forming the prediction block and/or calculating the residual block, video encoder 200 may perform the techniques of FIGS. 8 and/or 9. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
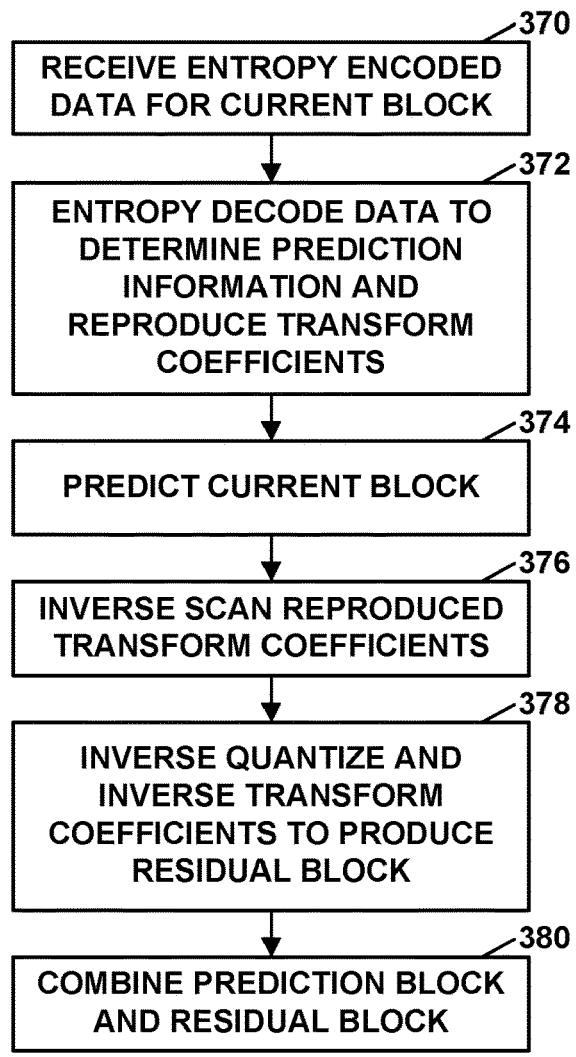
FIG. 11 is a flowchart illustrating an example of video decoding.

FIG. 11 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). As part of determining the prediction information, video decoder 200 may perform the techniques of FIGS. 8 and/or 9. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

This disclosure includes the following examples.

Clause 1A. A method of coding video data, the method comprising: determining whether an order of a subpicture has changed; if the order of the subpicture has changed, determining one or more of a subpicture ID or a subpicture mapping ID; if the order of the subpicture has not changed, not determining the one or more of the subpicture ID and the subpicture mapping ID; and coding the video data based on the order of the subpicture.

Clause 2A. A method of coding video data, the method comprising: determining whether subpic_info_present_flag is present in the video data; based on subpic_info_present_flag not being present, inferring a value for subpic_info_present_flag to be equal to 0; and coding the video data based on the value of subpic_info_present_flag.

Clause 3A. A method of coding video data, the method comprising: determining a flag in a sequence parameter set (SPS); and coding the video data based on the flag in the SPS, wherein the flag in the SPS is indicative of whether subpicture information syntax structure is signaled in the SPS or in a picture parameter set (PPS).

Clause 4A. The method of clause 3A, wherein the flag in the SPS indicates the subpicture information syntax structure is signaled in the PPS and the method further comprises: setting a length of syntax elements of a top-left position of each subpicture associated with the PPS to be Ceil(Log 2((pic_width_in_luma_samples+CtbSizeY−1)>>CtbLog 2SizeY)) and Ceil(Log 2((pic_height_in_luma_samples+CtbSizeY−1)>>CtbLog 2SizeY)) bits.

Clause 5A. A method of coding video data, the method comprising: determining an override flag in a PPS; based on the override flag being indicative of an override, overriding values of subpicture layout and properties of syntax elements in the PPS; and coding the video data based on the override.

Clause 6A. A method of coding video data, the method comprising: determining whether loop_filter_across_subpic_enabled_pic_flag[i] is present in the video data; based on loop_filter_across_subpic_enabled_pic_flag[i] not being present, inferring loop_filter_across_subpic_enabled_pic_flag[i] to be equal to 0; and coding the video data based on loop_filter_across_subpic_enabled_pic_flag[i].

Clause 7A. A method of coding video data, the method comprising: determining whether a video parameter set (VPS) is present in the video data; based on the VPS not being present, determining whether a value of sps_ptl_dpb_hrd_params_present_flag is equal to 1; if sps_ptl_dpb_hrd_params_present_flag is equal to 1, determining a profile-tier-layer (PTL) structure in an SPS; if sps_ptl_dpb_hrd_params_present_flag is not equal to 1, not determining a profile-tier-layer (PTL) structure in the SPS; and coding the video data based on sps_ptl_dpb_hrd_params_present_flag.

Clause 8A. The method of clause 7A, further comprising: determining whether sps_video_parameter_set_id is equal to 0; and based on sps_video_parameter_set_id being equal to 0, determining sps_ptl_dpb_hrd_params_present_flag to be equal to 1.

Clause 9A. A method of coding video data, the method comprising: determining whether sps_ptl_dpb_hrd_params_present_flag is equal to 1; if sps_ptl_dpb_hrd_params_present_flag is equal to 1, determining a flag, the flag being indicative of PTL syntax structure being present in the SPS; if sps_ptl_dpb_hrd_params_present_flag is not equal to 1, not determining the flag; and coding the video data based on sps_ptl_dpb_hrd_params_present_flag.

Clause 10A. A method of coding video data, the method comprising: determining whether no_gdr_constraint_flag is equal to 1; based on no_gdr_constraint_flag being equal to 1, determining gdr_enabled_flag to be equal to 0; and coding the video data based on the gdr_enabled_flag.

Clause 11A. A method of coding video data, the method comprising: determining whether non_reference_picture_flag is present in the video data; based on non_reference_picture_flag not being present, inferring non_reference_picture_flag to be equal to 1; and coding the video data based on non_reference_picture_flag.

Clause 12A. A method of coding video data, the method comprising: determining a location of non_reference_picture_flag; and coding the video data based on the non_reference_picture_flag, wherein the location of the non_reference_picture_flag is at a beginning of a picture header (PH) or immediately after a picture type flag in the PH.

Clause 13A. The method of clause 12A, wherein the picture type flag comprises gdr_or_irap_pic_flag or gdr_pic_flag.

Clause 14A. A method of coding video data, the method comprising: determining whether intra_only_constraint_flag is equal to 1; based on the intra_only_constraint_flag being equal to 1, determining sps_all_intra_enabled_flag to be equal to 1; and coding the video data based on sps_all_intra_enabled_flag.

Clause 15A. The method of clause 14A, further comprising conditioning a syntax element in a PH based on sps_all_intra_enabled_flag.

Clause 16A. The method of clause 15A, wherein the syntax element is at least one of ph_inter_slice_allowed_flag or non_reference_picture_flag.

Clause 17A. A method of coding video data, the method comprising: determining whether there is only one slice in a picture in the video data; if there is only one slice in the picture, presenting PH syntax structure in a slice header (SH); if there is not only one slice in the picture, not presenting PH syntax structure in the SH; and coding the video data based on the picture.

Clause 18A. The method of clause 17A, further comprising determining an SPS syntax element indicative of each picture in a CLVS containing only one slice.

Clause 19A. The method of clause 18A, wherein the SPS syntax element is sps_one_slice_per_picture.

Clause 20A. The method of clause 19A, further comprising conditioning a syntax element based on sps_one_slice_per_picture.

Clause 21A. The method of clause 20A, wherein the syntax element is picture_header_in_slice_header_flag Clause 22A. A method of coding video data, the method comprising: determining a syntax element in a PPS; based on the syntax element, determining that a picture referring to the PPS contains only one slice; and coding the video data based on the syntax element.

Clause 23A. The method of clause 22A, further comprising conditioning num_slices_in_pic_minus1 in the PPS and picture_header_in_slice_header_flag in a SH based on the syntax element.

Clause 24A. The method of clause 23A, further comprising: determining whether picture_header_in_slice_header_flag is present; based on picture_header_in_slice_header_flag not being present, inferring picture_header_in_slice_header_flag to be equal to 0; and coding the video data based on picture_header_in_slice_header_flag.

Clause 25A. A method of coding video data, the method comprising: determining whether picture_header_in_slice_header_flag is equal to 1; based on picture_header_in_slice_header_flag being equal to 1, determining that a content of picture_header_structure( ) is identical for all slices in a CLVS; and coding the video data based on the content of picture_header_structure( ).

Clause 26A. A method of coding video data, the method comprising: determining pps_pic_parameter_set_id; determining ph_pic_parameter_set_id; and coding the video data based on pps_pic_parameter_set_id and ph_pic_parameter_set_id, wherein pps_pic_parameter_set_id and ph_pic_parameter_set_id are of a same fixed length.

Clause 27A. The method of clause 26A, wherein the same fixed length is 6 bits.

Clause 28A. A method of coding video data, the method comprising: determining a maximal angular velocity of viewport movement; based on the maximal angular velocity, determining a value of MaxTileCols; and coding the video data based on the value of MaxTileCols.

Clause 29A. The method of clause 28A, wherein the maximal angular velocity is 300-degrees per second or 10 degrees per picture at 30 frames per second and the value of MaxTileCols is up to 36.

Clause 30A. A method of coding video data, the method comprising: determining a first N subpicture IDs, wherein an (N−1)th subpicture ID is a last subpicture whose ID is changed; and coding the video data based on the first N subpicture IDs.

Clause 31A. The method of clause 30A, wherein the first N subpicture IDs are signaled in a PPS.

Clause 32A. The method of clause 30A or 31A, further comprising refraining from signaling a subpicture index.

Clause 33A. The method of any combination of clauses 30A-32A, further comprising determining an override flag, wherein the coding the video data is further based on the override flag.

Clause 34A. The method of any combination of clauses 1A-33A, wherein coding comprises decoding.

Clause 35A. The method of any combination of clauses 1A, 3A-5A, 7A-10A, 12A-23A, and 25A-33A wherein coding comprises encoding.

Clause 36A. A device for coding video data, the device comprising one or more means for performing the method of any combination of clauses 1A-35A.

Clause 37A. The device of clause 36A, wherein the one or more means comprise one or more processors implemented in circuitry.

Clause 38A. The device of any of clauses 36A and 37A, further comprising a memory to store the video data.

Clause 39A. The device of any combination of clauses 36A-38A, further comprising a display configured to display decoded video data.

Clause 40A. The device of any combination of clauses 36A-39A, wherein the device comprises one or more of a camera, a computer, a mobile device, a broadcast receiver device, or a set-top box.

Clause 41A. The device of any combination of clauses 36A-40A, wherein the device comprises a video decoder.

Clause 42A. The device of any combination of clauses 36A-41A, wherein the device comprises a video encoder.

Clause 43A. A computer-readable storage medium having stored thereon instructions that, when executed, cause one or more processors to perform the method of any combination of clauses 1A-33A.

Clause 1B. A method of coding video data, the method comprising: determining whether a sequence parameter set of the video data refers to a video parameter set; based on the sequence parameter set not referring to the video parameter set, determining a value of a first syntax element to be indicative of a profile-tier-layer structure being signaled in the sequence parameter set; and coding the video data based on the profile-tier-layer structure.

Clause 2B. The method of claim 1B, wherein coding comprises encoding, and the method further comprises: signaling the first syntax element in the sequence parameter set; and signaling the profile-tier-layer structure in the sequence parameter set.

Clause 3B. The method of claim 1B, wherein coding comprises decoding, and the method further comprises: parsing the first syntax element in the sequence parameter set; and parsing the profile-tier-layer structure in the sequence parameter set.

Clause 4B. The method of any combination of claims 1B-3B, further comprising: determining a picture parameter set identifier of a picture parameter set, wherein the picture parameter set identifier has a fixed length of 6 bits.

Clause 5B. A method of coding video data, the method comprising: determining whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determining a value of a first syntax element to indicate gradual decoder refresh pictures are not present in a coded layer video sequence; and coding the video data of the coded layer video sequence without coding gradual decoder refresh pictures.

Clause 6B. The method of claim 5B, wherein coding comprises decoding, and wherein the method further comprises: determining whether a second syntax element indicative of whether a picture is not used as a reference picture is present in a bitstream; and based on the second syntax element not being present in the bitstream, inferring a value of the second syntax element to indicate that the picture is not a reference picture.

Clause 7B. The method of claim 5B, wherein coding comprises encoding, and wherein the method further comprises: determining whether a coded layer video sequence of the video data contains only one layer; determining whether an inter slice is allowed in a picture of the coded layer video sequence; based on the coded layer video sequence containing only one layer and the inter slice being allowed, determining a value of a second syntax element indicative of whether the picture is not used as a reference picture.

Clause 8B. The method of claim 7B, wherein the value of the second syntax element is indicative of the picture not being used as a reference picture, and wherein the method further comprises refraining from signaling the second syntax element.

Clause 9B. The method of any combination of claims 5B-8B, further comprising: determining a value of a third syntax element to indicate that all slices in a sequence are intra slices; and based on all slices in the sequence being intra slices, coding all slices in the sequence using intra prediction.

Clause 10B. The method of claim 9B, wherein coding comprises decoding and wherein determining the value of the third syntax element comprises parsing the third syntax element.

Clause 11B. The method of claim 9B, wherein coding comprises encoding, the method further comprising: signaling the third syntax element in an SPS.

Clause 12B. The method of any combination of claims 9B-11B, further comprising: determining a value of a fourth syntax element to indicate an intra only constraint is applied; wherein determining the value of the third syntax element is based on the intra only constraint being applied.

Clause 13. The method of any combination of claims 5B-12B, further comprising: determining a picture parameter set identifier of a picture parameter set, wherein the picture parameter set identifier has a fixed length of 6 bits.

Clause 14B. A device for coding video data, the device comprising: memory configured to store the video data; and one or more processors implemented in circuitry and communicatively coupled to the memory, the one more processors being configured to: determine whether a sequence parameter set of the video data refers to a video parameter set; based on the sequence parameter set not referring to the video parameter set, determine a value of a first syntax element to be indicative of a profile-tier-layer structure being signaled in the sequence parameter set; and code the video data based on the profile-tier-layer structure.

Clause 15B. The device of claim 14B, wherein code comprises encode, and the one or more processors are further configured to: signal the first syntax element in the sequence parameter set; and signal the profile-tier-layer structure in the sequence parameter set.

Clause 16B. The device of claim 14B, wherein code comprises decode, wherein as part of determining the value of the first syntax element, the one or more processors are configured to parse the first syntax element in the sequence parameter set, and wherein the one or more processors are further configured to: parse the profile-tier-layer structure in the sequence parameter set.

Clause 17B. The device of any combination of claims 14B-16B, further comprising: determining a picture parameter set identifier of a picture parameter set, wherein the picture parameter set identifier has a fixed length of 6 bits.

Clause 18B. A device for coding video data, the device comprising: memory configured to store the video data; and one or more processors implemented in circuitry and communicatively coupled to the memory, the one more processors being configured to: determine whether there is no network abstraction layer (NAL) unit with a NAL unit header type of a gradual decoding refresh NAL unit type in an output layer set; based on there being no NAL unit with the NAL unit header type of the gradual decoding refresh NAL unit type in the output layer set, determine a value of a first syntax element to indicate gradual decoder refresh pictures are not present in a coded layer video sequence; and code the video data of the coded layer video sequence without coding gradual decoder refresh pictures.

Clause 19B. The device of claim 18B, wherein code comprises decode, and wherein the one or more processors are further configured to: determine whether a second syntax element indicative of whether a picture is not used as a reference picture is present in a bitstream; and based on the second syntax element not being present in the bitstream, infer a value of the second syntax element to indicate that the picture is not a reference picture.

Clause 20B. The device of claim 18B, wherein code comprises encode, and wherein the one or more processors are further configured to: determine whether a coded layer video sequence of the video data contains only one layer; determine whether an inter slice is allowed in a picture of the coded layer video sequence; based on the coded layer video sequence containing only one layer and the inter slice being allowed, determine a value of a second syntax element indicative of whether the picture is not used as a reference picture.

Clause 21B. The device of claim 20B, wherein the value of the second syntax element is indicative of the picture not being a reference picture, and the one or more processors are further configured to: refrain from signaling the second syntax element.

Clause 22B. The device of any combination of claims 18B-21B, wherein the one or more processors are further configured to: determine a value of a third syntax element to indicate that all slices in a sequence are intra slices; and based on all slices in the sequence being intra slices, code all slices in the sequence using intra prediction.

Clause 23B. The device of claim 22B, wherein code comprises decode and wherein as part of determining the value of the third syntax element, the one or more processors are configured to: parsing the syntax element.

Clause 24B. The device of claim 22B, wherein code comprises encode, and wherein the one or more processors are further configured to: signal the third syntax element in an SPS.

Clause 25B. The device of any combination of claims 22B-24B, wherein the one or more processors are further configured to: determine a value of a fourth syntax element to indicate an intra only constraint is applied; wherein the one or more processors determine the value of the third syntax element based on the intra only constraint being applied.

Clause 26B. The device of any combination of claims 18B-25B, further comprising: determining a picture parameter set identifier of a picture parameter set, wherein the picture parameter set identifier has a fixed length of 6 bits.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a value of a sequence parameter set (SPS) video parameter set identification (ID), within a bitstream including the video data, is equal to zero;
    based on the determination that the value of the SPS video parameter set ID is equal to zero, determining that a SPS of the video data does not refer to a video parameter set (VPS) and that no VPS is referred to when decoding the video data referring to the SPS;
    based on the determination that the value of the SPS video parameter set ID is equal to zero such that the SPS of the video data does not refer to the VPS and that no VPS is referred to when decoding the video data referring to the SPS, determining, without processing a syntax element, from the bitstream, that indicates whether the profile-tier-layer structure is present in the SPS, that a profile-tier-layer structure is present within the SPS; and
    decoding the video data based on data of the profile-tier-layer structure included within the SPS.

2. The method of claim 1, further comprising decoding, from the SPS, a sps_video_parameter_set_id syntax element that indicates the value of the SPS video parameter set ID.

3. The method of claim 2, further comprising:
    fixed-length decoding a picture parameter set identifier of a picture parameter set associated with the video data, wherein the picture parameter set identifier has a fixed length of 6 bits.

4. A device for decoding video data, the device comprising:
    memory configured to store the video data; and
    one or more processors implemented in circuitry and communicatively coupled to the memory, the one more processors being configured to:
        determine that a value of a sequence parameter set (SPS) video parameter set identification (ID), within a bitstream including the video data, is equal to zero;
        based on the determination that the value of the SPS video parameter set ID is equal to zero, determine that a SPS of the video data does not refer to a video parameter set (VPS) and that no VPS is referred to when decoding the video data referring to the SPS;
        based on the determination that the value of the SPS video parameter set ID is equal to zero such that the SPS of the video data does not refer to the VPS and that no VPS is referred to when decoding the video data referring to the SPS, determine, without processing a syntax element, from the bitstream, that indicates whether the profile-tier-layer structure is present in the SPS, that a profile-tier-layer structure is present within the SPS; and
        decode the video data based on data of the profile-tier-layer structure included within the SPS.

5. The device of claim 4, wherein the one or more processors are further configured to decode, from the SPS, asps_video parameter set_id syntax element that indicates the value of the SPS video parameter set ID.

6. The device of claim 5, wherein the one or more processors are further configured to:
    fixed-length decode a picture parameter set identifier of a picture parameter set associated with the video data, wherein the picture parameter set identifier has a fixed length of 6 bits.

7. A non-transitory, computer-readable storage medium storing instructions that, when executed, cause one or more processors configured to decode video data to:
    determine that a value of a sequence parameter set (SPS) video parameter set identification (ID), within a bitstream including the video data, is equal to zero;
    based on the determination that the value of the SPS video parameter set ID is equal to zero, determine that a SPS of the video data does not refer to a video parameter set (VPS) and that no VPS is referred to when decoding the video data referring to the SPS;
    based on the determination that the value of the SPS video parameter set ID is equal to zero such that the SPS of the video data does not refer to the VPS and that no VPS is referred to when decoding the video data referring to the SPS, determine, without processing a syntax element, from the bitstream, that indicates whether the profile-tier-layer structure is present in the SPS, that a profile-tier-layer structure is present within the SPS; and
    decode the video data based on data of the profile-tier-layer structure included within the SPS.

8. The non-transitory, computer-readable storage medium of claim 7 further storing instructions that, when executed, cause the one or more processors configured to decode the video data to decode, from the SPS, a sps_video_parameter_set_id syntax element that indicates the value of the SPS video parameter set ID.

9. The non-transitory, computer-readable storage medium of claim 8 further storing instructions that, when executed, cause the one or more processors configured to decode the video data to fixed-length decode a picture parameter set identifier of a picture parameter set associated with the video data, wherein the picture parameter set identifier has a fixed length of 6 bits.

10. An apparatus configured to decode video data, the apparatus comprising:
    means for determining that a value of a sequence parameter set (SPS) video parameter set identification (ID), within a bitstream including the video data, is equal to zero;
    based on the determination that the value of the SPS video parameter set ID is equal to zero, means for determining that a SPS of the video data does not refer to a video parameter set (VPS) and that no VPS is referred to when decoding the video data referring to the SPS;
    based on the determination that the value of the SPS video parameter set ID is equal to zero such that the SPS of the video data does not refer to the VPS and that no VPS is referred to when decoding the video data referring to the SPS, means for determining, without processing a syntax element, from the bitstream, that indicates whether the profile-tier-layer structure is present in the SPS, that a profile-tier-layer structure is present within the SPS; and
    means for decoding the video data based on data of the profile-tier-layer structure included within the SPS.

11. The apparatus of claim 10 further comprising means for decoding, from the SPS, a sps_video_parameter_set_id syntax element that indicates the value of the SPS video parameter set ID.

12. The apparatus of claim 11 further comprising means for fixed length decoding a picture parameter set identifier of a picture parameter set associated with the video data, wherein the picture parameter set identifier has a fixed length of 6 bits.

* * * * *